US010174254B2

(12) United States Patent
Sudo et al.

(10) Patent No.: US 10,174,254 B2
(45) Date of Patent: Jan. 8, 2019

(54) NEMATIC LIQUID CRYSTAL COMPOSITION AND LIQUID CRYSTAL DISPLAY ELEMENT USING THE SAME

(71) Applicant: DIC Corporation, Tokyo (JP)

(72) Inventors: Go Sudo, Kita-adachi-gun (JP); Yasuo Umezu, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 5 days.

(21) Appl. No.: 15/105,807

(22) PCT Filed: Dec. 19, 2014

(86) PCT No.: PCT/JP2014/083679
§ 371 (c)(1),
(2) Date: Jun. 17, 2016

(87) PCT Pub. No.: WO2015/098740
PCT Pub. Date: Jul. 2, 2015

(65) Prior Publication Data
US 2016/0319195 A1 Nov. 3, 2016

(30) Foreign Application Priority Data

Dec. 25, 2013 (JP) .................... 2013-267009

(51) Int. Cl.
C09K 19/54 (2006.01)
C09K 19/30 (2006.01)
C09K 19/32 (2006.01)
C09K 19/20 (2006.01)
G02F 1/1343 (2006.01)
G02F 1/1368 (2006.01)
C09K 19/04 (2006.01)
C09K 19/12 (2006.01)

(52) U.S. Cl.
CPC ............ C09K 19/54 (2013.01); C09K 19/20 (2013.01); C09K 19/3066 (2013.01); C09K 19/322 (2013.01); G02F 1/1368 (2013.01); G02F 1/13439 (2013.01); C09K 2019/0448 (2013.01); C09K 2019/0466 (2013.01); C09K 2019/122 (2013.01); C09K 2019/301 (2013.01); C09K 2019/3004 (2013.01); C09K 2019/3016 (2013.01); C09K 2019/3019 (2013.01); C09K 2019/3078 (2013.01); G02F 2201/123 (2013.01)

(58) Field of Classification Search
CPC .... C09K 19/54; C09K 19/20; C09K 19/3066; C09K 2019/0448; C09K 2019/0446; C09K 2019/122; C09K 2019/3004; C09K 2019/301; C09K 2019/3016; C09K 2019/3019; C09K 2019/3078; G02F 1/13439
See application file for complete search history.

(56) References Cited

U.S. PATENT DOCUMENTS

| | | | |
|---|---|---|---|
| 9,175,221 B2 * | 11/2015 | Kawakami ........... | C09K 19/322 |
| 2010/0026953 A1 | 2/2010 | Hirschmann et al. | |
| 2014/0275577 A1 * | 9/2014 | Tojo ....................... | C09K 19/20 |
| | | | 549/427 |
| 2015/0152331 A1 * | 6/2015 | Kawakami ........... | C09K 19/322 |
| | | | 349/42 |
| 2015/0159086 A1 * | 6/2015 | Kaneoya ............ | C09K 19/3059 |
| | | | 252/299.62 |
| 2015/0184076 A1 * | 7/2015 | Kaneoya ................ | C09K 19/20 |
| | | | 428/1.25 |

FOREIGN PATENT DOCUMENTS

| | | | | |
|---|---|---|---|---|
| JP | 2008-37918 | A | 2/2008 | |
| JP | 2008-38018 | A | 2/2008 | |
| JP | 2010-275390 | A | 12/2010 | |
| JP | 2011-52120 | A | 3/2011 | |
| JP | WO 2012161178 | A1 * | 11/2012 | ............. C09K 19/20 |
| JP | 2013-173915 | A | 9/2013 | |
| JP | 2013-177612 | A | 9/2013 | |
| JP | 5534381 | B1 | 6/2014 | |
| WO | 2013/141116 | A1 | 9/2013 | |
| WO | 2013/187373 | A1 | 12/2013 | |

OTHER PUBLICATIONS

International Search Report dated Mar. 24, 2015, issued in counterpart International Application No. PCT/JP2014/083679 (2 pages).

* cited by examiner

Primary Examiner — Cynthia H Kelly
Assistant Examiner — Anna Malloy
(74) Attorney, Agent, or Firm — Westerman, Hattori, Daniels & Adrian, LLP

(57) ABSTRACT

The present invention relates to a liquid crystal composition, which is a liquid crystal composition containing a compound represented by General Formula (II-1) as an anti-oxidizing agent for a liquid crystal composition containing the compound represented by General Formula (II-1) and also as a first component, and a compound represented by General Formula (K) as a second component. The compound represented by General Formula (II-1) enables obtainment of a working effect of the anti-oxidizing agent, and therefore it allows provision of a liquid crystal composition containing the anti-oxidizing agent which has improved reliability like low temperature stability, while the high dielectric anisotropy is maintained.

5 Claims, 3 Drawing Sheets

NEMATIC LIQUID CRYSTAL COMPOSITION AND LIQUID CRYSTAL DISPLAY ELEMENT USING THE SAME

TECHNICAL FIELD

The present invention relates to a nematic liquid crystal composition of which dielectric anisotropy ($\Delta\varepsilon$) exhibits a positive value useful as a liquid crystal display material, and a liquid crystal display element using the same.

BACKGROUND ART

The liquid crystal display element is used in various kinds of measuring apparatus, a panel for an automobile, a word processor, an electronic organizer, a printer, a computer, a TV, a clock, an advertising display board and the like including a watch and an electronic calculator. The representative examples of the liquid crystal display method include a TN (twisted nematic) type, an STN (super twisted nematic) type, and a vertical alignment type using a TFT (thin film transistor), or a horizontal alignment type such as an IPS (in-plane switching) type or a FFS (fringe field switching) type. The liquid crystal composition used in these liquid crystal display elements is required to be stable with respect to external stimulations such as moisture, air, heat, and light, and to exhibit a liquid crystal phase in a wide temperature range around room temperature as possible, and to have a low viscosity and a low driving voltage. Furthermore, the liquid crystal composition is constituted with several kinds of compounds to several dozens of kinds of compounds in order to have dielectric anisotropy ($\Delta\varepsilon$) and/or refractive index anisotropy ($\Delta n$) values optimal for each display element.

In the vertical alignment (VA) type display, a liquid crystal composition having negative $\Delta\varepsilon$ is used, and in horizontal alignment type displays such as the TN type, the STN type, or the IPS (in-plane switching) type, a liquid crystal composition having positive $\Delta\varepsilon$ is used. A driving method in which a liquid crystal composition having positive $\Delta\varepsilon$ is vertically aligned when no voltage is applied, and a horizontal electric field is applied for display has also been reported, and the need for having the liquid crystal composition with positive $\Delta\varepsilon$ is further increased. Meanwhile, in all the driving methods, a low voltage driving, a high speed response, and a wide operating temperature range are required. That is to say, it is required for $\Delta\varepsilon$ to have a positive and high absolute value, for viscosity ($\eta$) to be low, and for a nematic phase-isotropic liquid phase transition temperature (Tni) to be high. In addition, it is necessary to adjust $\Delta n$ of the liquid crystal composition to an appropriate range in accordance with a cell gap by setting $\Delta n \times d$ which is a product of $\Delta n$ and the cell gap (d). Additionally, in a case in which the liquid crystal display element is applied to a TV or the like, the liquid crystal composition is required to have low rotational viscosity ($\gamma 1$) since a high speed response property is considered to be important.

As a constitution of the liquid crystal composition for high speed response, for example, liquid crystal compositions using in combination the compounds represented by Formula (A-1) or Formula (A-2) which are liquid crystal compounds having positive $\Delta\varepsilon$ and the liquid crystal compounds (B) of which $\Delta\varepsilon$ is neutral are disclosed. Characteristics of these liquid crystal compositions are that the liquid crystal compounds having positive $\Delta\varepsilon$ have a —$CF_2O$— structure and the liquid crystal compounds having neutral $\Delta\varepsilon$ have an alkenyl group, and these are widely known in the field of the liquid crystal composition (Patent Literatures 1 to 4).

[Chemical Formula 1]

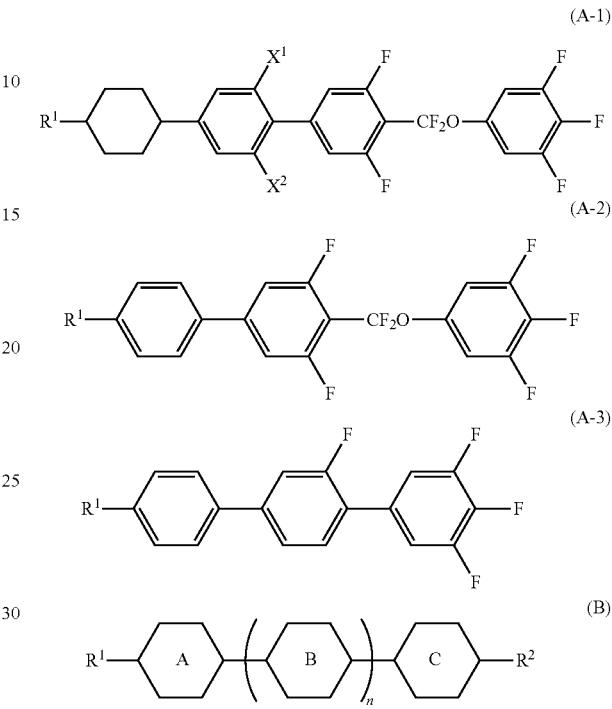

Furthermore, as described in Patent Literature 5, for example, for the purpose of preventing a decrease in specific resistance caused by heating in atmosphere or maintaining large voltage holding ratio near upper limit temperature of a nematic phase after long-term operation of a liquid crystal display element, an anti-oxidizing agent is generally mixed in a liquid crystal composition.

CITATION LIST

Patent Literature

Patent Literature 1: JP 2008-037918 A
Patent Literature 2: JP 2008-038018 A
Patent Literature 3: JP 2010-275390 A
Patent Literature 4: JP 2011-052120 A
Patent Literature 5: JP 2013-173915 A

SUMMARY OF INVENTION

Technical Problem

The liquid crystal compositions of the aforementioned Patent Literatures 1 to 5 have at least one characteristic of high upper limit temperature of a nematic phase, low lower limit temperature of a nematic phase, low viscosity, large optical anisotropy, high dielectric anisotropy, high specific resistance, high stability against UV ray, and high stability against heat.

On the other hand, as the application of the liquid crystal display element is expanded in recent years, great changes are seen in the application method and the manufacturing method thereof. In order to cope with these changes, optimization of characteristics other than the above fundamental physical property values known in the related art is required. That is to say, as the liquid crystal display element, the VA type or the IPS type is also widely used, a display element of which the size is also an extra-large size equal to or longer than 50 inches is put into practical use. With the increase in a substrate size of a liquid crystal display element, in an injection method of the liquid crystal composition into a substrate, the mainstream type of the injection method has been changed from a vacuum injection method in the related art to a drop injection (ODF: One Drop Fill) method, but the problem in that drop marks generated when the liquid crystal composition is dropped on a substrate leads to a decrease in display quality became an issue. Furthermore, in the liquid crystal display element manufacturing process by the ODF method, the optimal liquid crystal injection amount needs to be dropped according to the size of the liquid crystal display element. Thus, the liquid crystal injection amount greatly deviates from the optimal value, the balance of the refractive index and the driving electric field of the liquid crystal display element which is designed in advance is lost, and display defects such as generation of spots and poor contrast occur. In particular, in a small-sized liquid crystal display element which is frequently used in smart phones in recent years, it is difficult to control deviation from the optimal value to be within a certain range since the optimal liquid crystal injection amount is small. Therefore, in order to maintain a high yield of the liquid crystal display element, for example, effects with respect to rapid pressure change or impact in the dropping apparatus which occurs when the liquid crystal is dropped are required to be small, and performance capable of continuously and stably dropping a liquid crystal over a long period of time is also required.

Accordingly, in the liquid crystal composition used in an active matrix driving liquid crystal display element driven by a TFT element or the like, while maintaining characteristics and performance that are required as a liquid crystal display element such as high-speed response performance and the like, it is desired to have a development taking into consideration the manufacturing method of the liquid crystal display element, in addition to having characteristics of a high specific resistance value or a high voltage holding ratio which has been considered to be important in the related art and having stability against external stimulations such as light and heat. Accordingly, also for an anti-oxidizing agent to be added to the liquid crystal composition, it is required to maintain the characteristics of the liquid crystal composition.

However, it was confirmed that ionic impurities derived from an anti-oxidizing agent, which is present in a liquid crystal layer of the liquid crystal display element, are not only a cause for having a decrease in voltage holding ratio, but also, as the ionic impurities exhibit in-plane migration according to an electric field formed in the liquid crystal layer, they cause a new problem of having accumulation of the ionic impurities derived from the anti-oxidizing agent in a specific region like an area close to an electrode (hot spot) and forming a (line) afterimage of the accumulated region when seen from an outside.

Accordingly, an object of the present invention is to provide an anti-oxidizing agent which can solve the aforementioned problems, can be used for a liquid crystal composition of which dielectric anisotropy ($\Delta\varepsilon$) has a positive value, and can maintain the characteristics of liquid crystal composition which has a liquid crystal phase in a wide temperature range, low viscosity, excellent solubility at a low temperature so as to have high specific resistance or a high voltage holding ratio, and is stable with respect to heat or light, and also to provide a liquid crystal composition containing the anti-oxidizing agent. Furthermore, another object of the present invention is to provide, by using the same, a liquid crystal display element of the TN type, the IPS type, or the FFS type which has excellent display quality, and in which display defects such as burn-in or drop marks are unlikely to be generated, with a high productivity.

Solution to Problem

The present inventor has examined various liquid crystal compounds and various chemical substances, and as a result, has found that it is possible to solve the aforementioned problems by combining specific liquid crystal compounds, thereby completing the present invention.

Namely, provided by the present invention is a liquid crystal composition which contains, as a first component, an anti-oxidizing agent represented by General Formula (II-1):

[Chemical Formula 2]

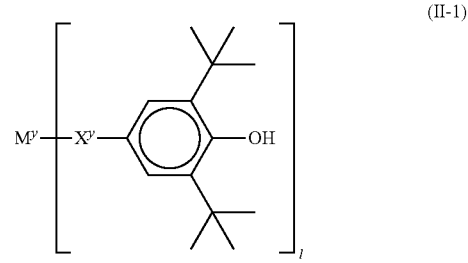

(II-1)

(in the formula, $M^y$ represents a hydrocarbon having carbon atom number of 1 to 25 (one or two or more —$CH_2$— in the hydrocarbon may be substituted with —O—, —CO—, —COO—, or —OCO— such that the oxygen atoms are not in direct contact with each other), a 1,4-phenylene group, or a trans-1,4-cyclohexylene group, in which any hydrogen atom of the 1,4-phenylene group may be substituted with a fluorine atom, $X^y$'s, which may be the same as or different from each other, represent an alkylene group having carbon atom number of 1 to 15 (one or two or more —$CH_2$— in the alkylene group may be substituted with —O—, —CO—, —COO—, or —OCO— such that the oxygen atoms are not in direct contact with each other), —$OCH_2$—, —$CH_2O$—, —COO—, —OCO—, —$CF_2O$—, —$OCF_2$—, —$CF_2CF_2$—, —CH═CH—COO—, —CH═CH—OCO—, —COO—CH═CH—, —OCO—CH═CH—, —CH═CH—, —C≡C—, a single bond, a 1,4-phenylene group, or a trans-1,4-cyclohexylene group in which any hydrogen atom of the 1,4-phenylene group may be substituted with a fluorine atom, and l represents an integer of 2 to 6), and, as a second component, a compound represented by General Formula (K):

[Chemical Formula 3]

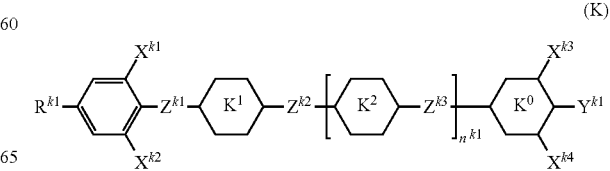

(K)

(in General Formula (K), $R^{k1}$'s each independently represent an alkyl group having carbon atom number of 1 to 10 or an alkenyl group having carbon atom number of 2 to 10, in which one or two or more non-adjacent —$CH_2$— in the group may be each independently substituted with —C≡C—, —O—, —CO—, —COO—, or —OCO—, and one or two or more hydrogen atoms in the group may be each independently substituted with a fluorine atom, ring $K^1$ and ring $K^2$ each independently represent a 1,4-cyclohexylene group (one or two or more non-adjacent —$CH_2$— in the group may be substituted with —O— or —S—) or a 1,4-phenylene group (one or two or more non-adjacent —CH= in the group may be substituted with —N=), and the hydrogen atoms in the group may be each independently substituted with a cyano group, a fluorine atom, or a chlorine atom, ring $K^0$ represents a naphthalene-2,6-diyl group or a 1,4-phenylene group in which the hydrogen atoms in the group may be each independently substituted with a fluorine atom, $Z^{k1}$, $Z^{k2}$, or $Z^{k3}$ each independently represents a single bond, —$CH_2CH_2$—, —$(CH_2)_4$—, —$OCH_2$—, —$CH_2O$—, —$OCF_2$—, —$CF_2O$—, —$CH_2CH_2CF_2O$—, —COO—, —OCO—, or —C≡C—, $n^{k1}$'s each independently represent 0, 1, 2, 3, or 4, with the proviso that, when $n^{k1}$ is 2 or more, the rings $K^2$ may be the same as or different from each other and $Z^{k3}$'s may be the same as or different from each other, $X^{k1}$, $X^{k2}$, $X^{k3}$, and $X^{k4}$ each independently represent a hydrogen atom, a chlorine atom, or a fluorine atom, and

[Chemical Formula 5]

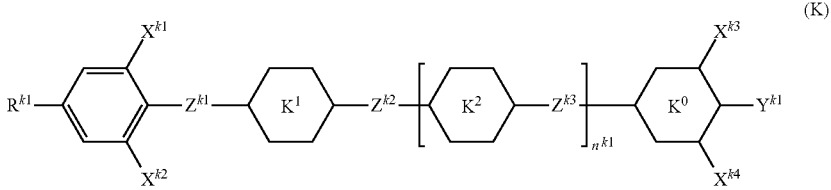

(K)

$Y^{k1}$'s each independently represent a chlorine atom, a fluorine atom, a cyano group, a trifluoromethyl group, a fluoromethoxy group, a difluoromethoxy group, a trifluoromethoxy group, or a 2,2,2-trifluoroethyl group, but represent a fluorine atom, a trifluoromethyl group, a fluoromethoxy group, a difluoromethoxy group, or a trifluoromethoxy group), and a liquid crystal display element using the liquid crystal composition.

Advantageous Effects of Invention

Because the liquid crystal composition of the present invention enables obtainment of significantly low viscosity or rotational viscosity, has high specific resistance or voltage holding ratio due to good solubility at low temperature, and exhibits an extremely small change caused by heat or light, the practicability of the product is high and the liquid crystal display element of the TN type or the IPS type using the same can achieve the high-speed response performance. In addition, display defects like drop mark or line afterimage are suppressed, and therefore it has very high usefulness.

DESCRIPTION OF EMBODIMENTS

Figure 1:
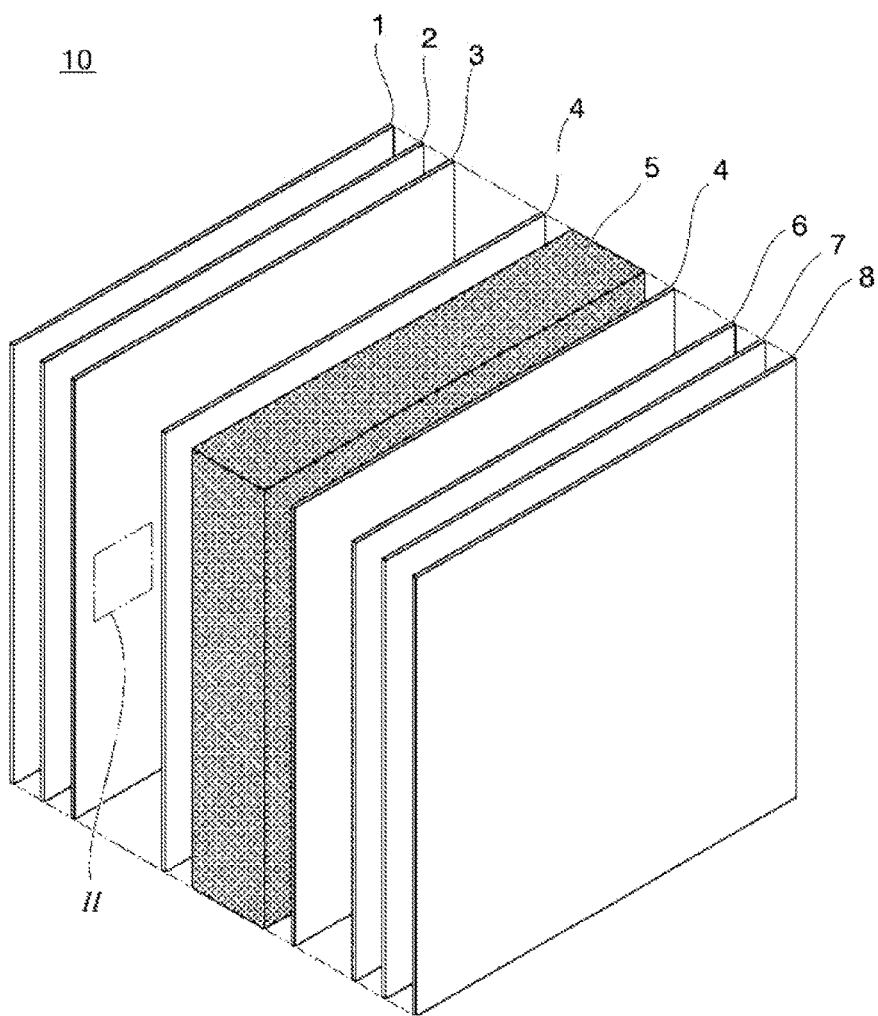
FIG. 1 is a drawing illustrating schematically the constitution of a liquid crystal display element according to the present invention.

The present invention relates to a liquid crystal composition which contains,

[Chemical Formula 4]

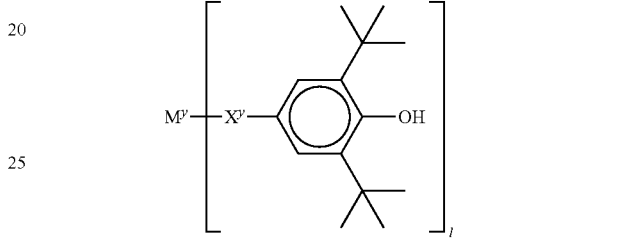

(II-1)

as a first component, an anti-oxidizing agent represented by General Formula (II-1) above, and as a second component, a compound represented by General Formula (K) above.

In General Formula (II-1), $M^y$ represents a hydrocarbon having carbon atom number of 1 to 25 (one or two or more —$CH_2$— in the hydrocarbon may be substituted with —O—, —CO—, —COO—, or —OCO— such that the oxygen atoms are not in direct contact with each other), a 1,4-phenylene group, or a trans-1,4-cyclohexylene group, in which any hydrogen atom of the 1,4-phenylene group may be substituted with a fluorine atom, $X^y$'s, which may be the same as or different from each other, represent an alkylene group having carbon atom number of 1 to 15 (one or two or more —$CH_2$— in the alkylene group may be substituted with —O—, —CO—, —COO—, or —OCO— such that the oxygen atoms are not in direct contact with each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, a 1,4-phenylene group, or a trans-1,4-cyclohexylene group in which any hydrogen atom of the 1,4-phenylene group may be substituted with a fluorine atom, and l represents an integer of 2 to 6).

The compound represented by General Formula (II-1) according to the present invention allows obtainment of a working effect of an anti-oxidizing agent, and therefore it is possible to provide a liquid crystal composition which includes the anti-oxidizing agent and has improved reliability like low temperature stability while maintaining high dielectric anisotropy.

In General Formula (II-1), it is preferable that $M^y$ is a hydrocarbon having carbon atom number of 1 to 10 (one or two or more —$CH_2$— in the hydrocarbon may be substituted with —O—, —CO—, —COO—, or —OCO— such that the oxygen atoms are not in direct contact with each other). Furthermore, it is preferable that $X^y$ is an alkylene group having carbon atom number of 2 to 10 (one or two or more —$CH_2$— in the alkylene group may be substituted with —O—, —CO—, —COO—, or —OCO— such that the oxygen atoms are not in direct contact with each other), a single bond, a 1,4-phenylene group, or a trans-1,4-cyclohexylene group. Furthermore, l groups of $X^y$ in General Formula (II-1) may be the same as or different from each other, but they are preferably the same as each other. l is preferably an integer of 2 to 4, and more preferably 2.

The compound represented by General Formula (II-1) according to the present invention is preferably a compound represented by the following General Formula (II-2).

[Chemical Formula 6]

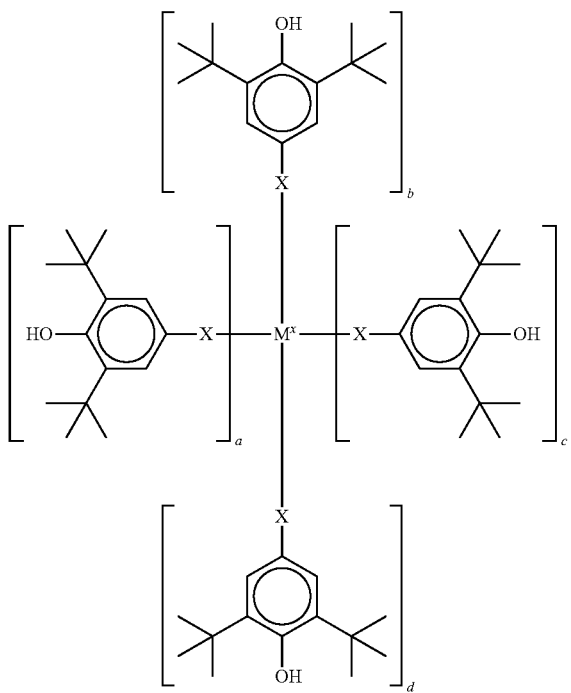

(II-2)

In the above General Formula (II-2), $M^x$ represents a hydrocarbon having carbon atom number of 1 to 25 (one or two or more —$CH_2$— in the hydrocarbon may be substituted with —O—, —CO—, —COO—, or —OCO— such that the oxygen atoms are not in direct contact with each other), but it is preferably a hydrocarbon having carbon atom number of 2 to 15 (one or two or more —$CH_2$— in the hydrocarbon may be substituted with —O—, —CO—, —COO—, or —OCO— such that the oxygen atoms are not in direct contact with each other).

In the above General Formula (II-2), X's each independently represent an alkylene group having carbon atom number of 1 to 15 (one or two or more —$CH_2$— in the alkylene group may be substituted with —O—, —CO—, —COO—, or —OCO— such that the oxygen atoms are not in direct contact with each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, a 1,4-phenylene group (any hydrogen atom of the 1,4-phenylene group may be substituted with a fluorine atom), or a trans-1,4-cyclohexylene group. However, they are preferably an alkylene group having carbon atom number of 2 to 15 (one or two or more —$CH_2$— in the alkylene group may be substituted with —O—, —CO—, —COO—, or —OCO— such that the oxygen atoms are not in direct contact with each other), a single bond, a 1,4-phenylene group, or a trans-1,4-cyclohexylene group. Furthermore, four X's in the above General Formula (II-2) may be the same as or different from each other, but they are preferably the same as each other.

In the above General Formula (II-2), a, b, c, and d each independently represent 0 or 1, but a+b+c+d represents 2 or higher. a+b+c+d is more preferably 2 to 4, and more preferably 2.

The anti-oxidizing agent represented by General Formula (II-1) according to the present invention is preferably a hindered phenol derivative which is represented by the following General Formula (II).

[Chemical Formula 7]

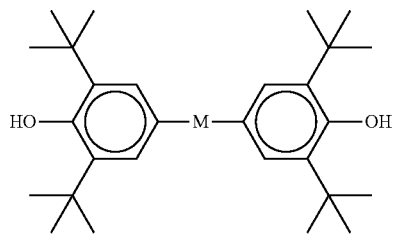

(II)

In General Formula (II), M represents an alkylene group having carbon atom number of 1 to 15 (one or two more —$CH_2$— in the alkylene group may be substituted with —O—, —CO—, —COO—, or —OCO— such that the oxygen atoms are not in direct contact with each other), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, —C≡C—, a single bond, 1,4-phenylene group (any hydrogen atom of the 1,4-phenylene group may be substituted with a fluorine atom), or a trans-1,4-cyclohexylene group. However, it is preferably an alkylene group having carbon atom number of 1 to 14. Considering the volatility, a higher carbon atom number is preferred. However, because it is also preferred not to have an excessively high carbon atom number when the viscosity is considered, with regard to M in General Formula (II) according to the present invention, the carbon atom number of 2 to 12 is more preferable, the carbon atom number of 3 to 10 is more preferable, the carbon atom number of 4 to 10 is more preferable, the carbon atom number of 5 to 10 is more preferable, and the carbon atom number of 6 to 10 is more preferable.

The anti-oxidizing agent according to the present invention is particularly preferably compound which is represented by the following Formula (II-a6), Formula (II-a7), Formula (II-a8), Formula (II-a9), or Formula (II-a10).

[Chemical Formula 8]

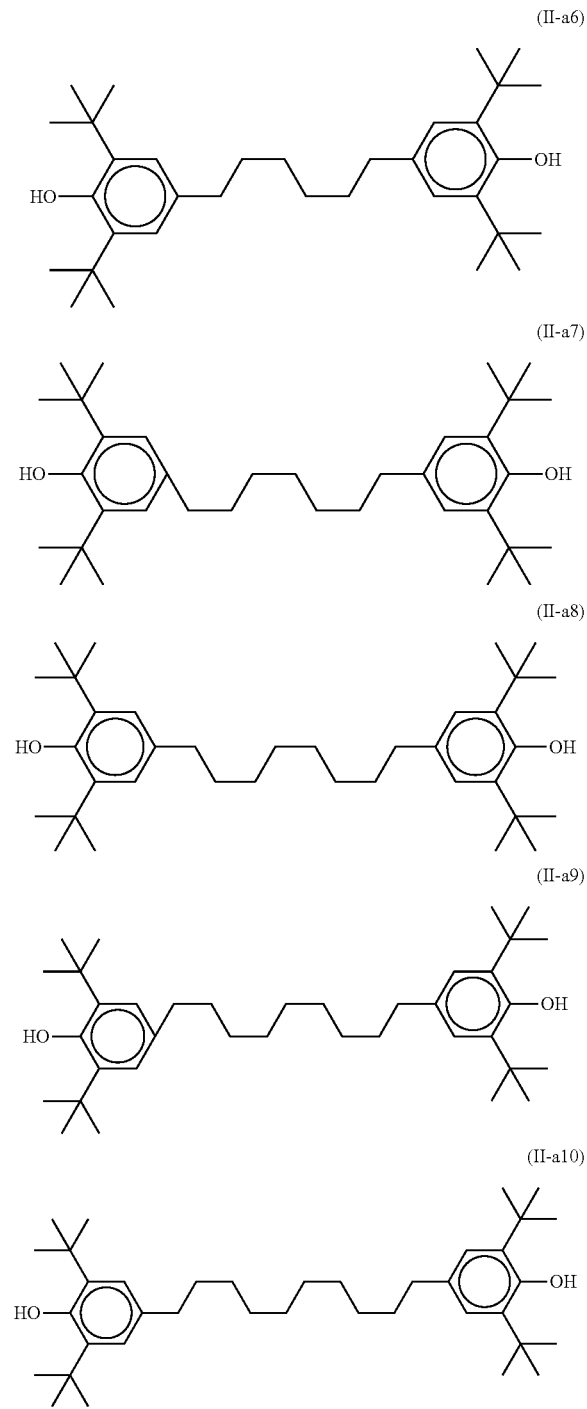

(II-a6)

(II-a7)

(II-a8)

(II-a9)

(II-a10)

The anti-oxidizing agent according to the present invention preferably coexists with a liquid crystal compound, and it more preferably coexists with a nematic liquid crystal compound (or a nematic liquid crystal composition). In that case, it is preferable that one or more kinds of the anti-oxidizing agent are contained in the liquid crystal composition. The content is preferably 0.001 to 1% by mass, more preferably 0.001 to 0.5% by mass, and particularly preferably 0.01 to 0.3% by mass.

The liquid crystal composition according to the present invention preferably contains one or two or more liquid crystal compound having positive dielectric anisotropy with an absolute value of 4 or higher. The content of the liquid crystal compound is preferably 3% by mass or more but 5% by mass or more, more preferably 10% by mass or more, and particularly preferably 20% by mass or more. More specifically, it is preferably 3% by mass to 70% by mass, more preferably 5% by mass to 60% by mass, even more preferably 10% by mass to 60% by mass, and particularly preferably 20% by mass to 60% by mass. Furthermore, the dielectric anisotropy of the liquid crystal compound indicates a value at 20° C.

As described herein, the "liquid crystal composition" indicates a composition which contains a liquid crystal compound having positive dielectric anisotropy with an absolute value of 4 or higher, and the anti-oxidizing agent according to the present invention.

The liquid crystal composition containing the compound, which is represented by General Formula (K) and is contained in the liquid crystal composition according to the present invention, and the anti-oxidizing agent is preferable in that it can maintain high dielectric anisotropy (Δε) and has excellent reliability.

Thus, it is preferable that the compound represented by General Formula (K) has positive dielectric anisotropy with an absolute value of 4 or higher and the content of the compound in the liquid crystal composition according to the present invention is 3% by mass or more. The content of the compound represented by General Formula (K) in the liquid crystal composition according to the present invention is preferably 1% by mass or more, more preferably, 3% by mass or more, even more preferably 5% by mass or more, and still even more preferably 10% by mass or more. More specifically, it is preferably 3% by mass to 70% by mass, more preferably 5% by mass to 60% by mass, even more preferably 10% by mass to 60% by mass, and still even more preferably 10% by mass to 50% by mass.

One or two or more kinds of the compound represented by General Formula (K) for addition are contained in the liquid crystal composition according to the present invention. Preferably, 1 to 10 kinds of the compound are contained. More preferably 1 to 8 kinds of the compound are contained. Even more preferably 2 to 8 kinds of the compound are contained. Particularly preferably, 2 to 5 kinds of the compound are contained.

In General Formula (K) according to the present invention, $R^{k1}$'s each independently represent an alkyl group with carbon atom number of 1 to 10 or an alkenyl group with carbon atom number of 2 to 10. However, they are preferably an alkyl group with carbon atom number of 1 to 8 or an alkenyl group with carbon atom number of 2 to 8. More preferably, they are an alkyl group with carbon atom number of 1 to 5 or an alkenyl group with carbon atom number of 2 to 5. Furthermore, one or two or more non-adjacent —$CH_2$— in the group may be each independently substituted with —C≡C—, —O—, —CO—, —COO—, or —OCO—, and one or two or more hydrogen atoms in the group may be each independently substituted with a fluorine atom.

With regard to General Formula (K) according to the present invention, it is preferable that the ring $K^1$ and ring $K^2$ are each independently at least one group selected from a group consisting of a 1,4-cyclohexylene group (one or two or more non-adjacent —$CH_2$— in the group may be substituted with —O— or —S—), a tetrahydropyran-2,5-diyl group, or a 1,4-phenylene group (one or two or more non-adjacent —CH= in the group may be substituted with —N=), a 3-fluoro-1,4-phenylene group, a 3,5-difluoro-1,4-phenylene group, and a dioxane group. More preferably, they are a 1,4-cyclohexylene group or a 1,4-phenylene group, and the hydrogen atoms in the group may be each independently substituted with a cyano group, a fluorine atom, or a chlorine atom.

The ring $K^0$ represents a naphthalene-2,6-diyl group or a 1,4-phenylene group in which the hydrogen atoms in the group may be each independently substituted with a fluorine atom, With regard to General Formula (K) according to the present invention, $Z^{k1}$, $Z^{k2}$, and $Z^{k3}$ each independently represent a single bond, —$CH_2CH_2$—, —$(CH_2)_4$—, —$OCH_2$—, —$CH_2O$—, —$OCF_2$—, —$CF_2O$—, —$CH_2CH_2CF_2O$—, —COO—, —OCO—, or —C≡C—, but they are preferably a single bond, —$CH_2CH_2$—, —$OCH_2$—, —$CH_2O$—, —$OCF_2$—, or —$CF_2O$—, and more preferably a single bond, —$OCH_2$—, or —$OCF_2$—. When explained in greater detail, $Z^{k1}$ is preferably —$OCH_2$— or —$OCF_2$—, and more preferably —$OCH_2$—. $Z^{k2}$ and $Z^{k3}$ are preferably a single bond, —$OCH_2$—, —$CH_2O$—, —$OCF_2$— or —$CF_2O$—, and more preferably a single bond.

With regard to General Formula (K) according to the present invention, $n^{k1}$ represents 0, 1, 2, or 3. It is more preferably 0, 1, or 2. It is more preferably 0 or 1. Furthermore, when $n^{k1}$ is 2 or more, the rings $K^2$ may be the same as or different from each other and $Z^{k3}$'s may be the same as or different from each other.

With regard to General Formula (K) according to the present invention, $X^{k1}$, $X^{k2}$, $X^{k3}$, and $X^{k4}$ each independently represent a hydrogen atom, a chlorine atom, or a fluorine atom, and they are more preferably a hydrogen atom or a fluorine atom.

With regard to General Formula (K) according to the present invention, $Y^{k1}$'s each independently represent a chlorine atom, a fluorine atom, a cyano group, a trifuloromethyl group, a fluoromethoxy group, a difluoromethoxy group, a trifluoromethoxy group, or a 2,2,2-trifluoroethyl group. They are preferably a fluorine atom, a trifuloromethyl group, a fluoromethoxy group, a difluoromethoxy group, or a trifluoromethoxy, and more preferably a fluorine atom, a trifluoromethoxy group, or a trifuloromethyl group.

The compound represented by General Formula (K) according to the present invention is preferably at least one selected from a group consisting of the compounds that are represented by the following General Formula (K1) and General Formula (K2).

[Chemical Formula 9]

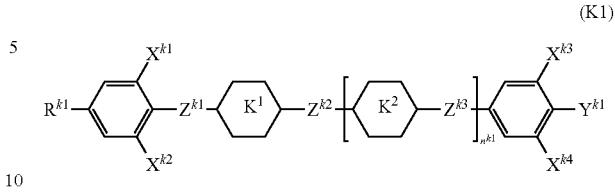

(K1)

(in the above General Formula (K1), $R^{k1}$, ring $K^1$, ring $K^2$, $n^{k1}$, $X^{k1}$, $X^{k2}$, $X^{k3}$, $X^{k4}$ $Y^{k1}Z^{k1}$, $Z^{k2}$, and $Z^{k3}$ are as defined in the above for General Formula (K), and thus further explanations are omitted herein)

[Chemical Formula 10]

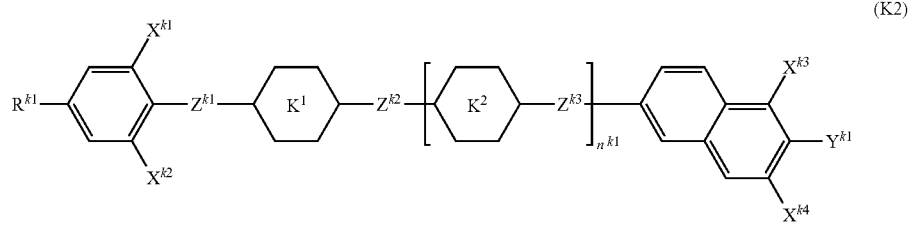

(K2)

(in the above General Formula (K2), $R^{k1}$, ring $K^1$, ring $K^2$, $n^{k1}$, $X^{k1}$, $X^{k2}$, $X^{k3}$, $X^{k4}$, $Y^{k1}Z^{k1}$, $Z^{k2}$ and $Z^{k3}$ are as defined in the above for General Formula (K), and thus further explanations are omitted herein). The content of the compound represented by General Formula (K1) in the liquid crystal composition according to the present invention is preferably 1% by mass or more, more preferably, 3% by mass or more, even more preferably 5% by mass or more, and still even more preferably 10% by mass or more. More specifically, it is preferably 3% by mass to 70% by mass, more preferably 5% by mass to 60% by mass, even more preferably 10% by mass to 60% by mass, and still even more preferably 10% by mass to 50% by mass.

The content of the compound represented by General Formula (K2) in the liquid crystal composition according to the present invention is preferably 1% by mass or more, more preferably, 3% by mass or more, even more preferably 5% by mass or more, and still even more preferably 10% by mass or more. More specifically, it is preferably 3% by mass to 70% by mass, more preferably 5% by mass to 60% by mass, even more preferably 10% by mass to 60% by mass, and still even more preferably 10% by mass to 50% by mass.

It is preferable that, in the liquid crystal composition according to the present invention, at least one selected from a group consisting of the compound represent by General Formula (K1) and the compound represent by General Formula (K2) is contained.

It is preferable that, in the liquid crystal composition according to the present invention, at least one compound represented by General Formula (K1) is contained, and more preferably 2 to 5 kinds of the compound are contained.

It is preferable that, in the liquid crystal composition according to the present invention, at least one compound represented by General Formula (K2) is contained, and more preferably 2 to 5 kinds of the compound are contained.

It is also preferable that, in the liquid crystal composition according to the present invention, at least one compound represented by General Formula (K1) is contained and also at least one compound represented by General Formula (K2) is contained.

It is preferable that, in the liquid crystal composition according to the present invention, one or two or more kinds of the compound represented by General Formula (K1) and the compound represented by General Formula (K2) are contained in total. Preferably, 1 to 10 kinds of the compounds are contained. More preferably, 1 to 8 kinds of the compounds are contained. Even more preferably, 2 to 8 kinds of the compounds are contained. Particularly preferably, 2 to 5 kinds of the compounds are contained.

The compound represented by General Formula (K) according to the present invention is preferably a compound selected from a compound group which is represented by the following General Formulae (K11) to (K28). More preferably, it is a compound selected from a compound group which is represented by General Formulae (K11) to (K17) and General Formulae (K25) to (K28). Particularly preferably, it is a compound selected from a compound group which is represented by General Formulae (K11) to (K17).

[Chemical Formula 11]

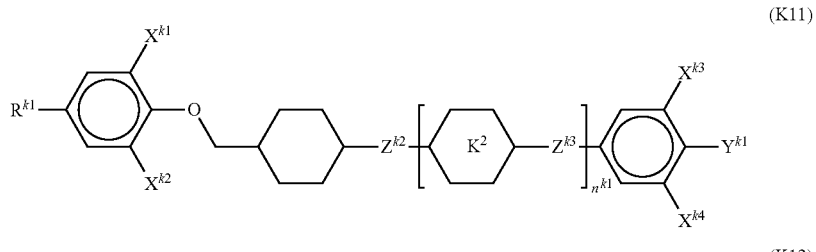

(K11)

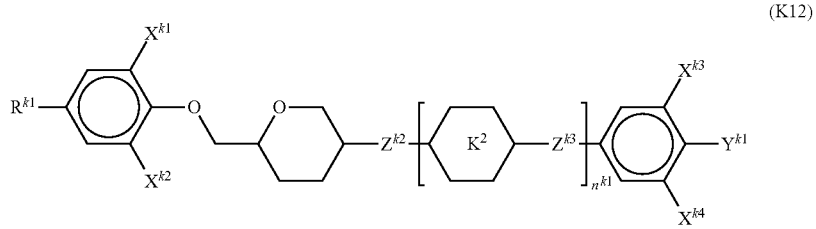

(K12)

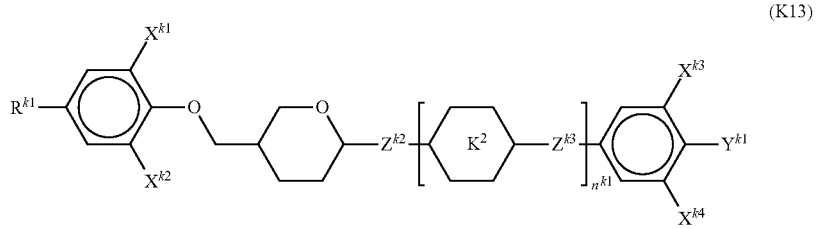

(K13)

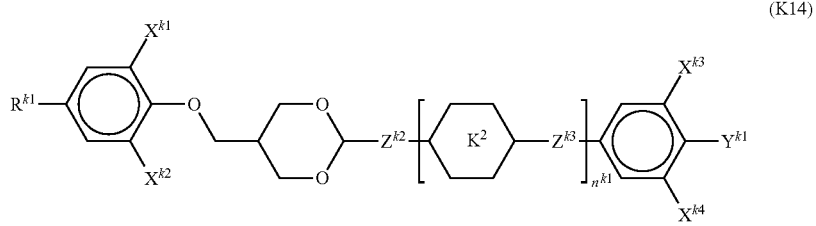

(K14)

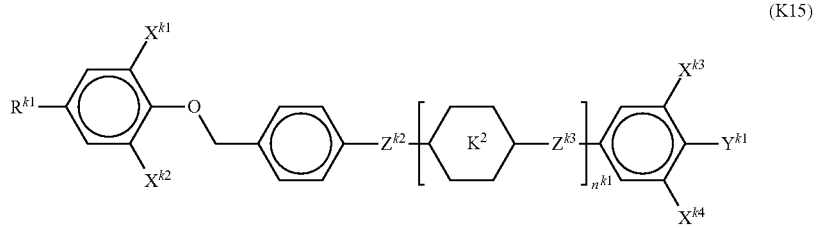

(K15)

(K16)
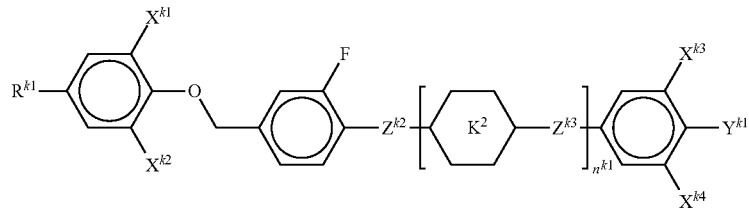
(K17)
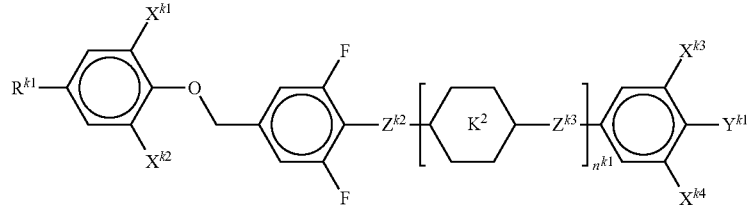
[Chemical Formula 12]
(K18)
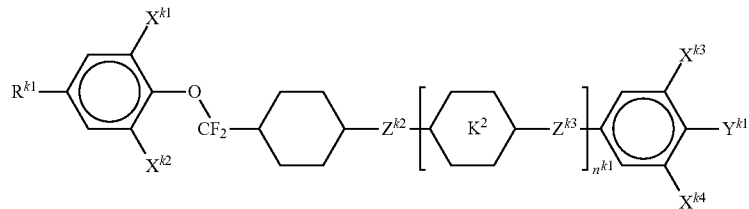
(K19)
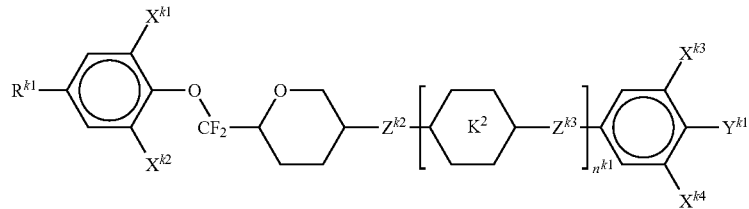
(K20)
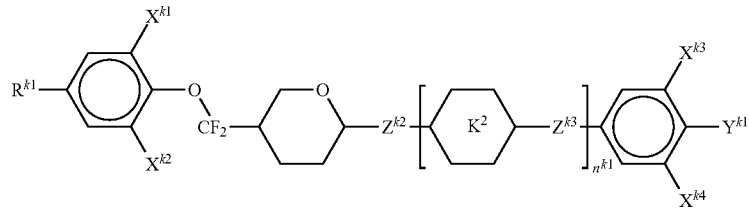
(K21)
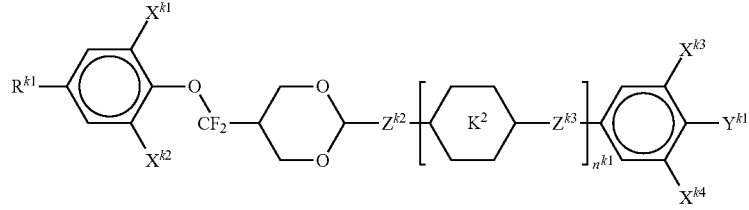
(K22)
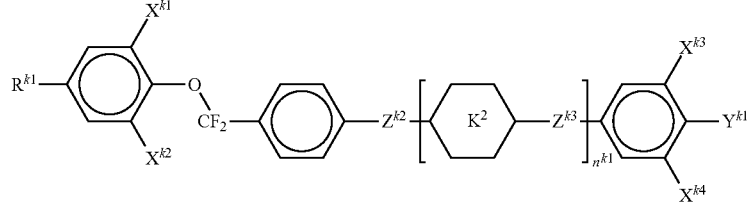

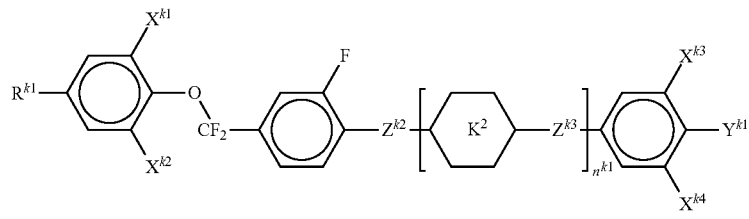
(K23)

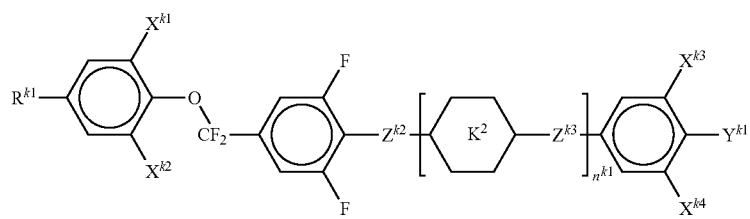
(K24)

[Chemical Formula 13]

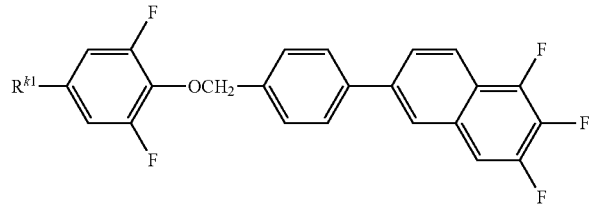
(k25)

[Chemical Formula 14]

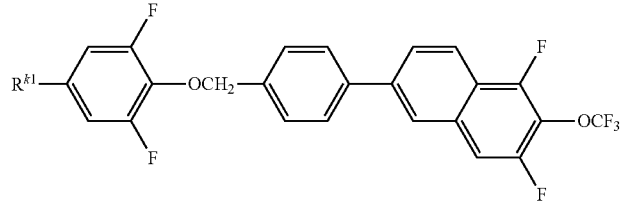
(K26)

[Chemical Formula 15]

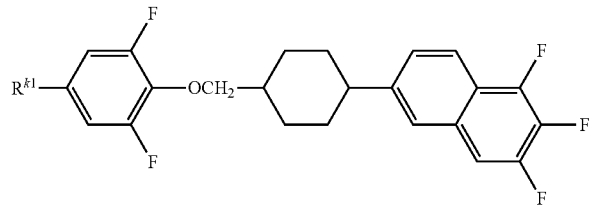
(K27)

[Chemical Formula 16]

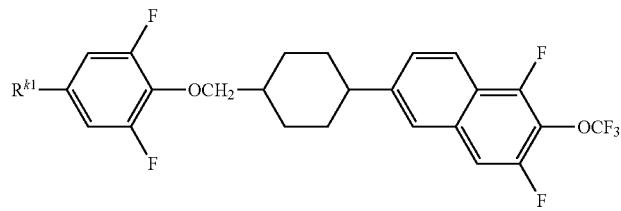
(K28)

In the above General Formulae (K11) to (K28), $R^{k1}$, $X^{k1}$, $X^{k2}$, $Z^{k2}$, ring $K^2$, $Z^{k3}$, $n^{k1}$, $X^{k3}$, $X^{k4}$ and $Y^{k1}$ are as defined above. However, $X^{k1}$ and $X^{k2}$ are particularly preferably a fluorine atom, $Z^{k2}$ and $Z^{k3}$ are particularly preferably a single bond. The ring $K^2$ is preferably a 1,4-phenylene group, a 3-fluoro-1,4-phenylene group, or a 3,5-difluoro-1,4-phenylene group and particularly preferably a 3,5-difluoro-1,4-phenylene group. $n^{k1}$ is preferably 0 or 1, and particularly preferably 1. $X^{k3}$ and $X^{k4}$ are particularly preferably a fluorine atom, and $Y^{k1}$ is preferably a fluorine atom or a trifluoromethoxy group and particularly preferably a fluorine atom.

The content of the compound represented by General Formulae (K11) to (K17) in the liquid crystal composition according to the present invention is preferably 1% by mass or more, more preferably, 3% by mass or more, even more preferably 5% by mass or more, and still even more preferably 10% by mass or more. More specifically, it is preferably 3% by mass to 70% by mass, more preferably 5% by mass to 60% by mass, even more preferably 10% by mass to 60% by mass, and still even more preferably 10% by mass to 50% by mass.

The content of the compound represented by General Formulae (K25) to (K28) in the liquid crystal composition according to the present invention is preferably 1% by mass or more, more preferably, 3% by mass or more, even more preferably 5% by mass or more, and still even more preferably 10% by mass or more. More specifically, it is preferably 3% by mass to 70% by mass, more preferably 5% by mass to 60% by mass, even more preferably 10% by mass to 60% by mass, and still even more preferably 10% by mass to 50% by mass.

It is preferable that, in the liquid crystal composition according to the present invention, one or two or more kinds of the compound represented by General Formulae (K11) to (K17) are contained. Preferably, 1 to 10 kinds of the compound are contained. More preferably, 1 to 8 kinds of the compound are contained. Even more preferably, 2 to 8 kinds of the compound are contained. Particularly preferably, 2 to 5 kinds of the compounds are contained.

It is preferable that, in the liquid crystal composition according to the present invention, one or two or more kinds of the compound represented by General Formulae (K25) to (K28) are contained. Preferably, 1 to 10 kinds of the compound are contained. More preferably, 1 to 8 kinds of the compound are contained. Even more preferably, 2 to 8 kinds of the compound are contained. Particularly preferably, 2 to 5 kinds of the compounds are contained.

The liquid crystal composition according to the present invention may contain, as a liquid crystal compound having positive dielectric anisotropy with an absolute value of 4 or higher, a compound represented by General Formula (N).

[Chemical Formula 17]

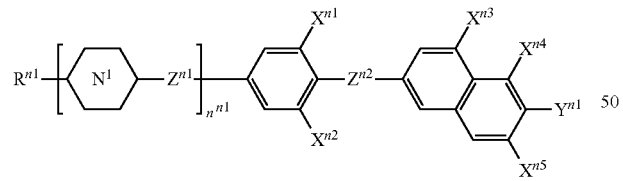

(N)

In the above General Formula (N1), $R^{n1}$ represents an alkyl group with carbon atom number of 1 to 10, or an alkenyl group with carbon atom number of 2 to 10, in which one or two or more non-adjacent —$CH_2$— in the group may be each independently substituted with —C≡C—, —O—, —CO—, —COO—, or —OCO—, and one or two or more hydrogen atoms in the group may be each independently substituted with a fluorine atom.

In the above General Formula (N1), the ring $N^1$ represents a 1,4-cyclohexylene group (one or two or more non-adjacent —$CH_2$— in the group may be substituted with —O— or —S—) or a 1,4-phenylene group (one or two or more non-adjacent —CH= in the group may be substituted with —N=), and the hydrogen atoms in the group may be each independently substituted with a cyano group or a fluorine atom.

In the above General Formula (N1), $Z^{n1}$ and $Z^{n2}$ each independently represent a single bond, —$CH_2CH_2$—, —$(CH_2)_4$—, —$OCH_2$—, —$CH_2O$—, —$OCF_2$—, —$CF_2O$—, —$CH_2CH_2CF_2O$—, —COO—, —OCO—, or —C≡C—.

In the above General Formula (N1), $n^{n1}$'s each independently represent an integer of 0 to 4, with the proviso that, when $n^{n1}$ is 2 or more, the rings $N^1$ may be the same as or different from each other and $Z^{n1}$'s may be the same as or different from each other.

In the above General Formula (N1), $X^{n1}$, $X^{n2}$, $X^{n3}$, $X^{n4}$, and $X^{n5}$ each independently represent a hydrogen atom or a fluorine atom, In the above General Formula (N1), $Y^{n1}$ represents a fluorine atom, a cyano group, a trifuloromethyl group, a fluoromethoxy group, a difluoromethoxy group, a trifluoromethoxy group, or a 2,2,2-trifluoroethyl group, or a fluorine atom, a trifuloromethyl group, a fluoromethoxy group, a difluoromethoxy group, or a trifluoromethoxy group.

The liquid crystal composition according to the present invention also containing the compound represented by General Formula (N) is preferable in that it can maintain high dielectric anisotropy (Δn) and has excellent reliability.

The content of the compound represented by General Formula (N) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

One or two or more kinds of the compound represented by General Formula (N) are contained in the liquid crystal composition according to the present invention. Preferably, 1 to 10 kinds of the compound are contained. More preferably 1 to 8 kinds of the compound are contained. Even more preferably 2 to 8 kinds of the compound are contained. Particularly preferably, 2 to 5 kinds of the compound are contained.

The compound represented by General Formula (N) according to the present invention is preferably a compound selected from a group consisting of the compounds that are represented by the following General Formula (N1) and General Formula (N2), and it is more preferably a compound represented by General Formula (N2).

[Chemical Formula 18]

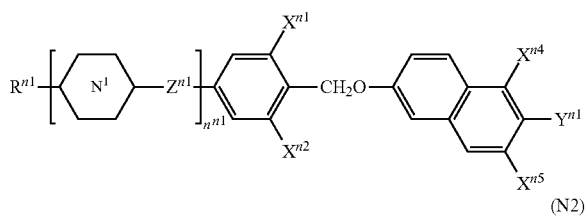

(N1)

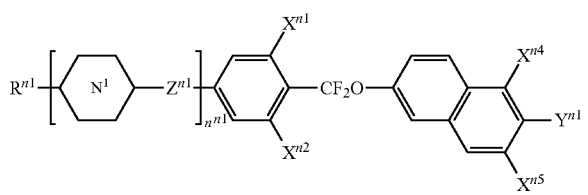

(N2)

In the above General Formula (N1) and General Formula (N2), $R^{n1}$, ring $N^1$, $Z^{n1}$, $n^{n1}$, $X^{n1}$, $X^{n2}$, $X^{n4}$, $X^{n5}$ and $Y^{n1}$ are as defined above. However, the ring $N^1$ is preferably a 1,4-cyclohexylene group, a tetrahydropyran-2,5-diyl group, a 1,4-phenylene group, a 3-fluoro-1,4-phenylene group, a 3,5-difluoro-1,4-phenylene group, or a dioxane group. It is more preferably a 1,4-phenylene group, a 3-fluoro-1,4-phenylene group, or a 3,5-difluoro-1,4-phenylene group. $Z^{n1}$ is particularly preferably a single bond, and $n^{n1}$ is preferably 0 or 1. $X^{n1}$ and $X^{n2}$ are preferably a hydrogen atom or a fluorine atom. More preferably, at least one of them is a fluorine atom. Particularly preferably, both of them are a fluorine atom. $X^{n4}$ and $X^{n5}$ are preferably a hydrogen atom or a fluorine atom. More preferably, at least one of them is a fluorine atom. Particularly preferably, both of them are a fluorine atom. $Y^{n1}$ is preferably a fluorine atom or a trifluoromethoxy group.

The content of the compound represented by General Formula (N1) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

The content of the compound represented by General Formula (N2) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

The compound represented by General Formula (N) according to the present invention is also preferably a compound represented by the following General Formula (N3).

[Chemical Formula 19]

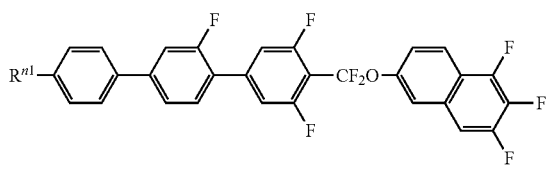
(N3)

In the above General Formula (N3), $R^{n1}$, ring $N^1$, $X^{n1}$, $X^{n2}$, $X^{n4}$, $X^{n5}$ and $Y^{n1}$ are as defined above. In the above General Formula (N3), $X^1$ and $X^2$ each independently represent a hydrogen atom or a fluorine atom. Preferably, at least one of them is a fluorine atom. Also preferably, both of them are a fluorine atom. In the above General Formula (N3), the ring $N^1$ represents a 1,4-cyclohexylene group, a tetrahydropyran-2,5-diyl group, a 1,4-phenylene group, a 3-fluoro-1,4-phenylene group, a 3,5-difluoro-1,4-phenylene group, or a dioxane group. It is more preferably a 1,4-phenylene group, a 3-fluoro-1,4-phenylene group, or a 3,5-difluoro-1,4-phenylene group. In the above General Formula (N3), n represents an integer of 0 to 2. It is preferably 0 or 1.

The content of the compound represented by General Formula (N3) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

One or two or more kinds of the compound represented by General Formula (N3) are contained in the liquid crystal composition according to the present invention. Preferably, 1 to 10 kinds of the compound are contained. More preferably 1 to 8 kinds of the compound are contained. Even more preferably 2 to 8 kinds of the compound are contained. Particularly preferably, 2 to 5 kinds of the compound are contained.

The compound represented by the following General Formula (N3) according to the present invention is preferably those of following (N11) to (N14).

[Chemical Formula 20]

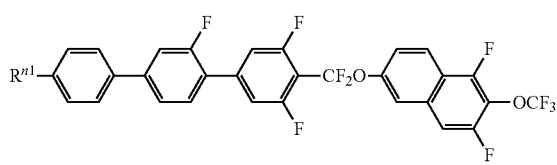
(N11)

[Chemical Formula 21]

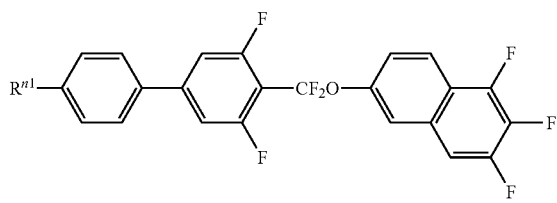
(N12)

[Chemical Formula 22]

(N13)

[Chemical Formula 23]

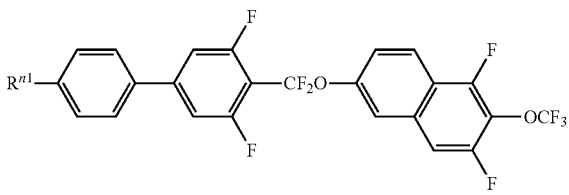
(N14)

The content of the compound represented by General Formulae (N11) to (N14) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

As for the liquid crystal compound having positive dielectric anisotropy with an absolute value of 4 or higher which is to be contained in the liquid crystal composition of the present invention, a compound of General Formula (Pa) is also preferable.

[Chemical Formula 24]

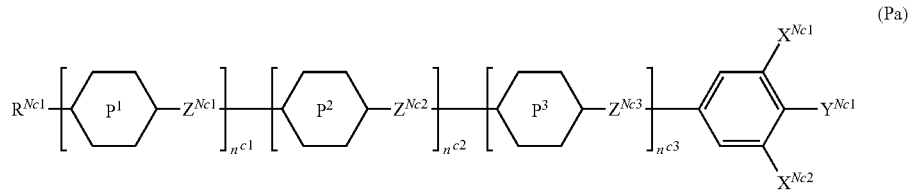

In the above General Formula (Pa), $R^{Nc1}$ represents an alkyl group with carbon atom number of 1 to 8, or an alkenyl group with carbon atom number of 2 to 8, in which one or two or more non-adjacent —$CH_2$— in the group may be each independently substituted with —C≡C—, —O—, —CO—, —COO—, or —OCO—. However, it is preferably an alkyl group with carbon atom number of 1 to 5 or an alkenyl group with carbon atom number of 2 to 5.

In the above General Formula (Pa), the ring $P^1$, $P^2$ and $P^3$ each independently represent a 1,4-cyclohexylene group (one or two or more non-adjacent —$CH_2$— in the group may be substituted with —O— or —S—) or a 1,4-phenylene group (one or two or more non-adjacent —CH= in the group may be substituted with —N=), and the hydrogen atoms in the group may be each independently substituted with a cyano group, a fluorine atom, or a chlorine atom. However, they are preferably a 1,4-cyclohexylene group, a tetrahydropyran-2,5-diyl group, a 1,4-phenylene group, a 3-fluoro-1,4-phenylene group, or a 3,5-difluoro-1,4-phenylene group.

In the above General Formula (Pa), $Z^{Nc1}$, $Z^{Nc2}$ or $Z^{Nc3}$ each independently represents a single bond, —$CH_2CH_2$—, —$(CH_2)_4$—, —$OCH_2$—, —$CH_2O$—, —$OCF_2$—, —$CF_2O$—, —COO—, —OCO—, or —C≡C—. However, it is more preferably a single bond, —$CH_2CH_2$—, —$CH_2O$—, or —$CF_2O$—. More preferably, any one of $Z^{Nc1}$, $Z^{Nc2}$ and $Z^{Nc3}$ that are present is a single bond. It is also preferable that all of them are a single bond.

In the above General Formula (Pa), $n^{c1}$, $n^{c2}$ or $n^{c3}$ each independently represents 0, 1, or 2. $n^{c1}+n^{c2}+n^{C3}$ represents 1 to 5. However, it is more preferably 4 or less, and particularly preferably 3 or less.

In the above General Formula (Pa), $X^{Nc1}$ and $X^{Nc2}$ each independently represent a hydrogen atom or a fluorine atom.

In the above group of General Formula (Pa), $Y^{Nc1}$ represents a fluorine atom, a chlorine atom, a cyano group, a trifluoromethyl group, a fluoromethoxy group, a difluoromethoxy group, a trifluoromethoxy group, or a 2,2,2-trifluoroethyl group. However, it is preferably a fluorine atom, a trifuloromethyl group, a fluoromethoxy group, a difluoromethoxy group, or a trifluoromethoxy group. It is more preferably a fluorine atom, a trifuloromethyl group, or a trifluoromethoxy group.

The content of the compound represented by General Formula (Pa) in the liquid crystal composition according to the present invention is preferably 0 to 60% by mass, more preferably 1 to 50% by mass, more preferably 1 to 40% by mass, more preferably 5 to 40% by mass, and particularly preferably 10 to 40% by mass.

One or two or more kinds of the compound represented by General Formula (Pa) are contained in the liquid crystal composition according to the present invention. Preferably, 1 to 10 kinds of the compound are contained. More preferably 1 to 8 kinds of the compound are contained. Even more preferably 2 to 8 kinds of the compound are contained. Particularly preferably, 2 to 5 kinds of the compound are contained.

The compound represented by the General Formula (Pa) according to the present invention is preferably a compound selected from a compound group represented by General Formulae (P01) to (P80).

[Chemical Formula 25]

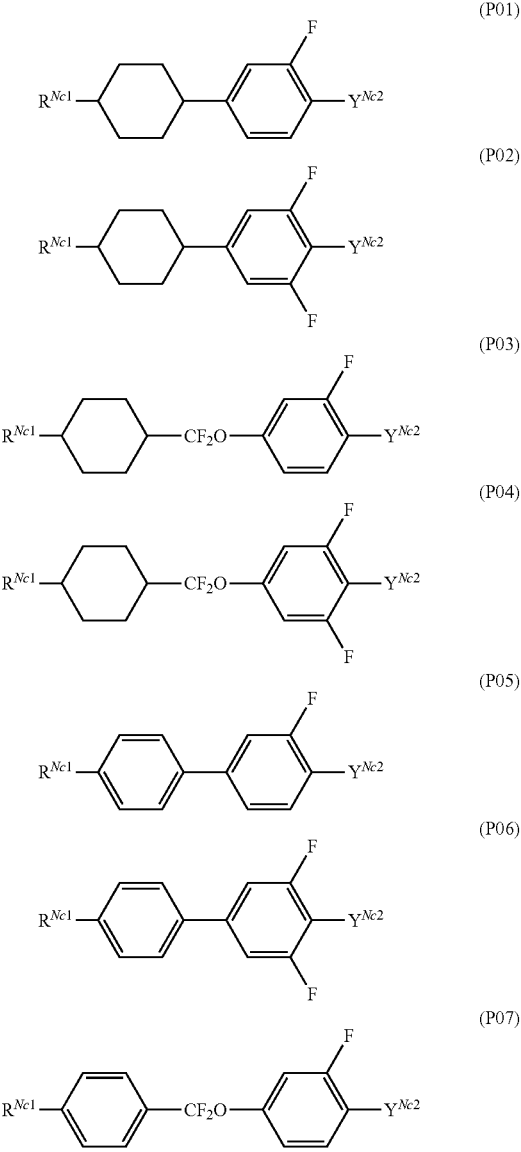

(P08) 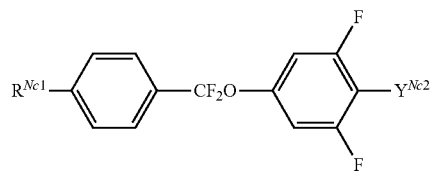
(P09) 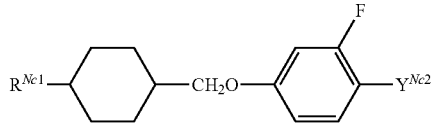
(P10) 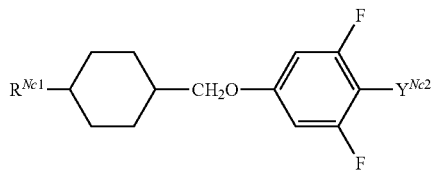
(P11) 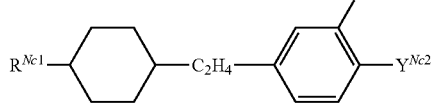
(P12) 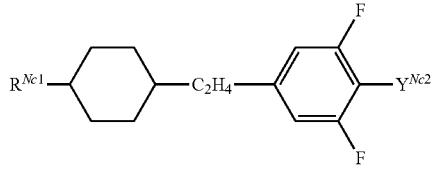
(P13) 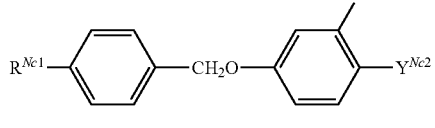
(P14) 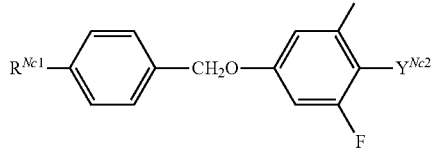
(P15) 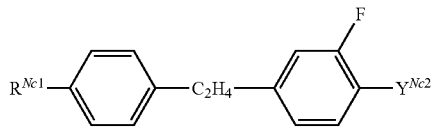
(P16) 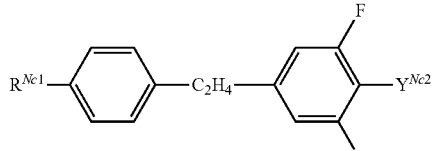
[Chemical Formula 26]
(P17) 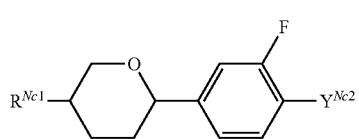
(P18) 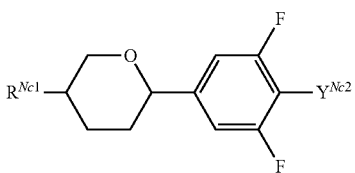
(P19) 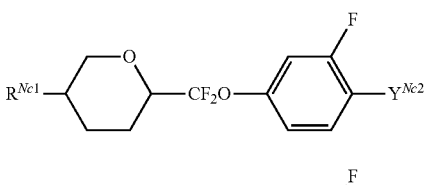
(P20) 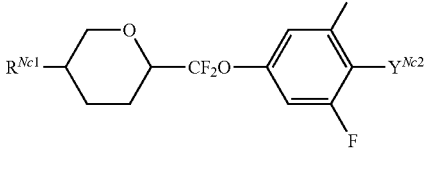
(P21) 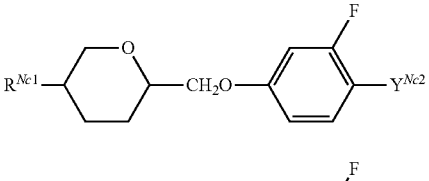
(P22) 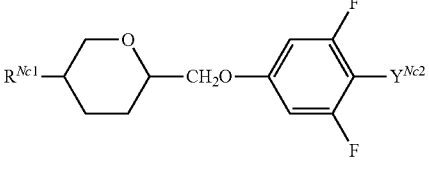
(P23) 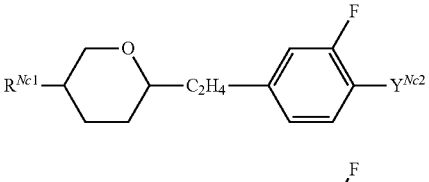
(P24) 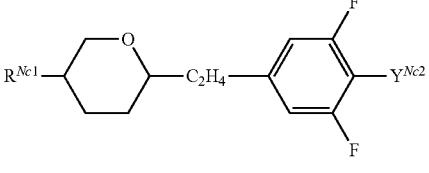
[Chemical Formula 27]
(P25) 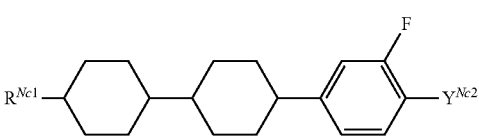
(P26) 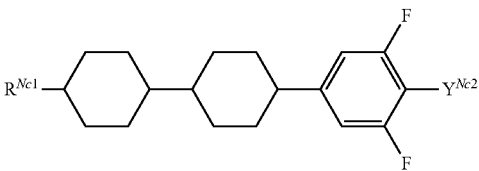

(P27) 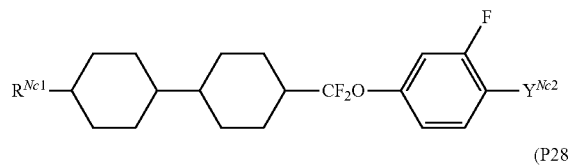
(P28) 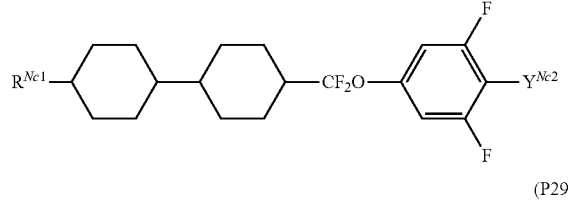
(P29) 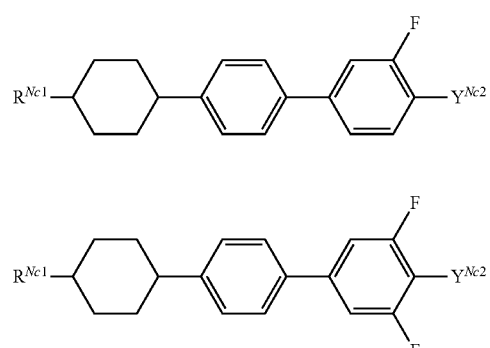
(P30)
(P31) 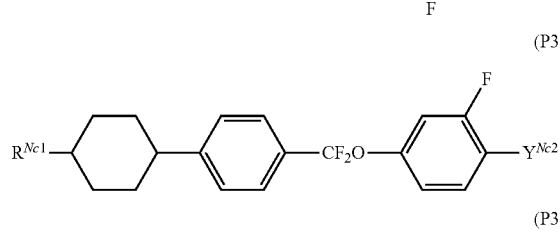
(P32) 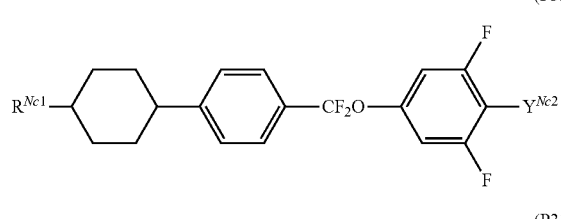
(P33) 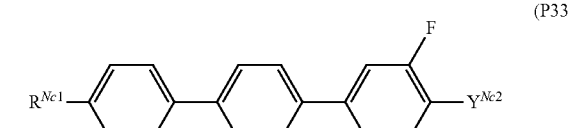
(P34) 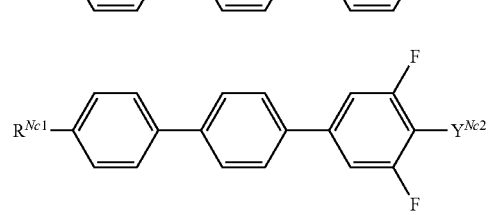
(P35) 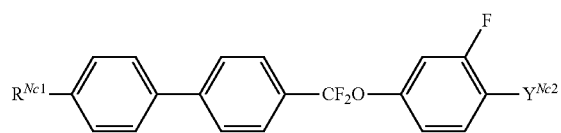
(P36) 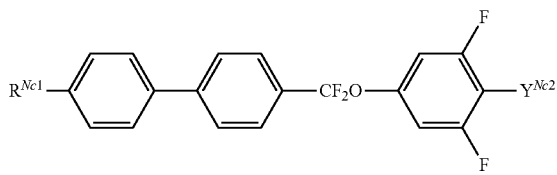
[Chemical Formula 28]
(P37) 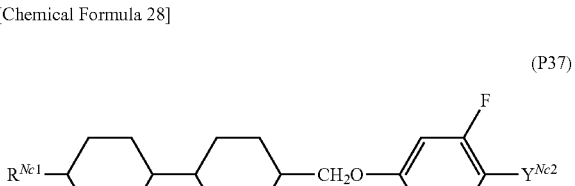
(P38)
(P39) 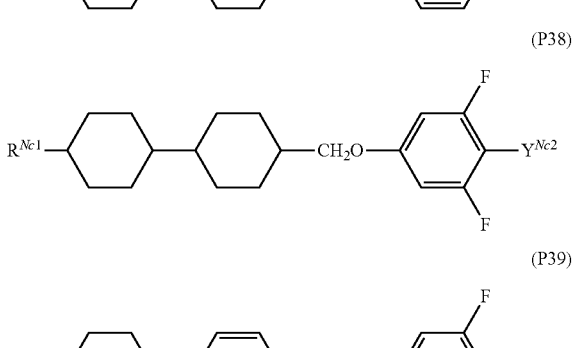
(P40) 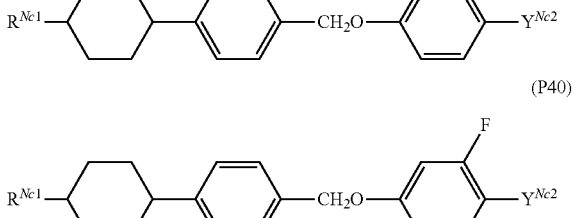
(P41) 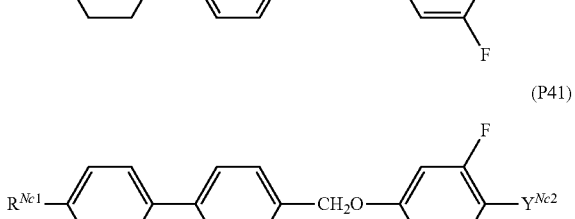
(P42) 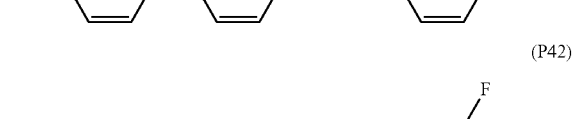
(P43) 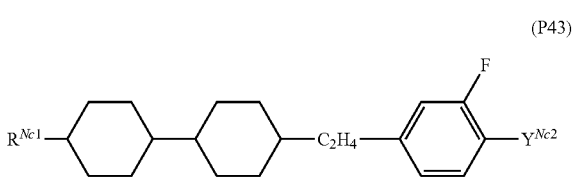

(P44) 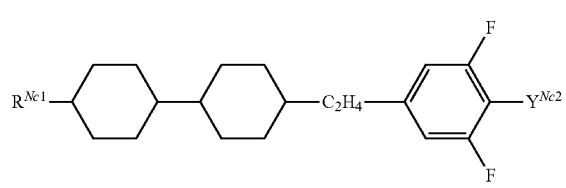
(P45) 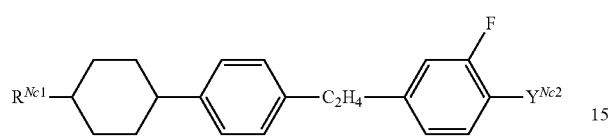
(P46) 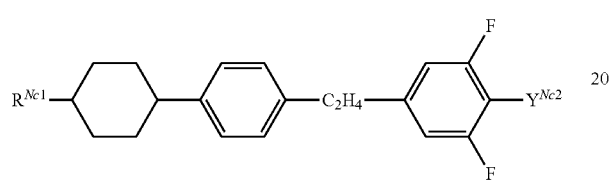
(P47) 
(P48) 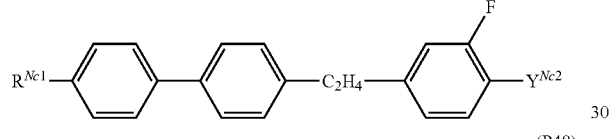
[Chemical Formula 29]
(P49) 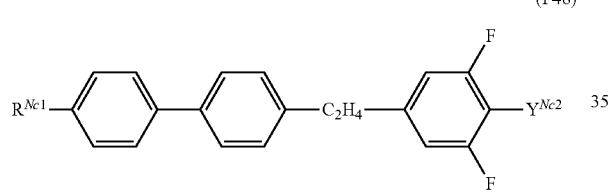
(P50) 
(P51) 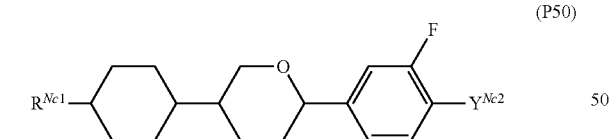
(P52) 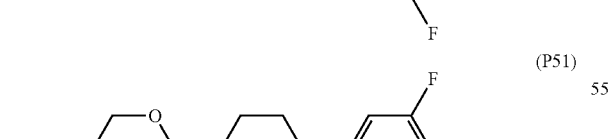
(P53) 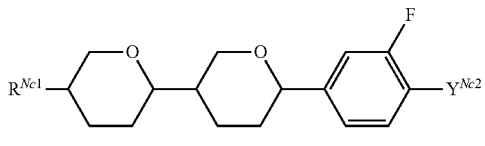
(P54) 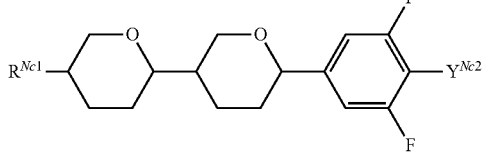
(P55) 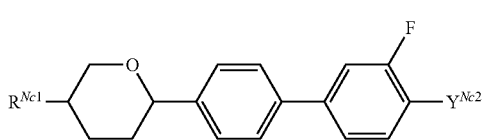
(P56) 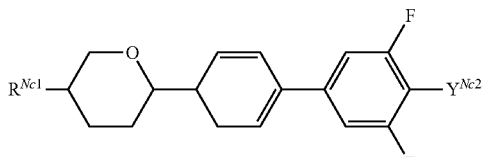
(P57) 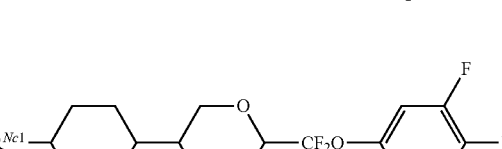
(P58) 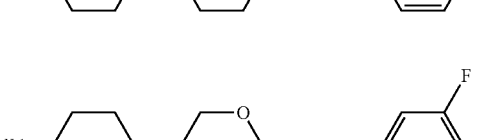
(P59) 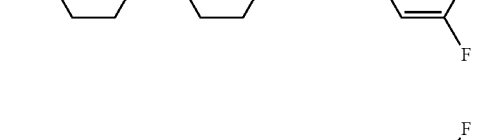
(P60) 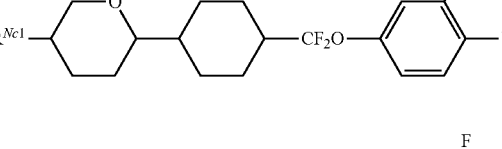
(P61) 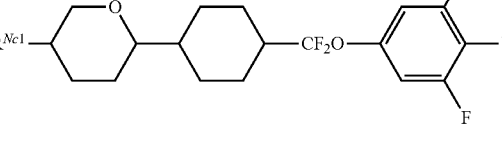

(P62) 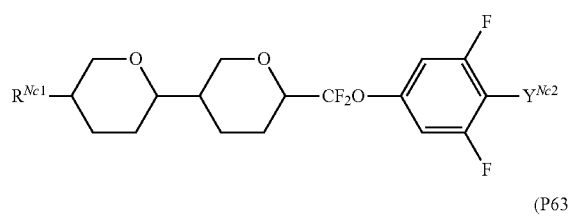
(P63) 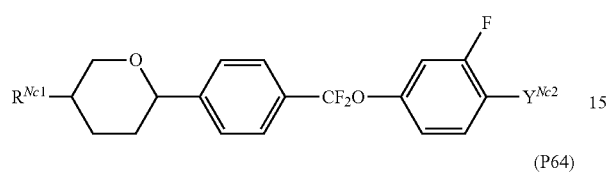
(P64) 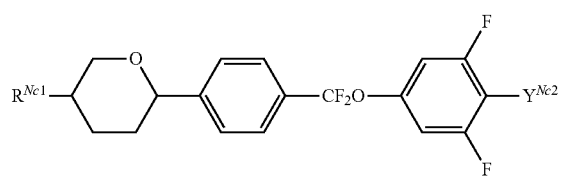
[Chemical Formula 30]
(P65) 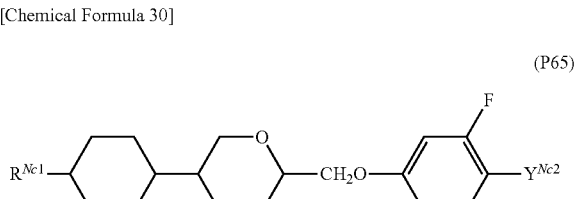
(P66) 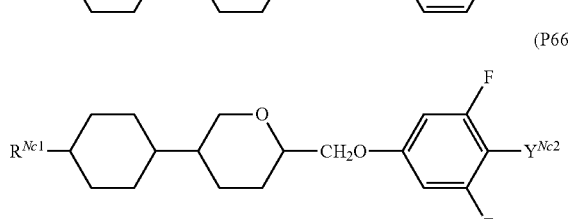
(P67) 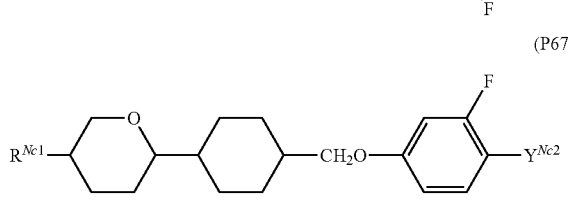
(P68) 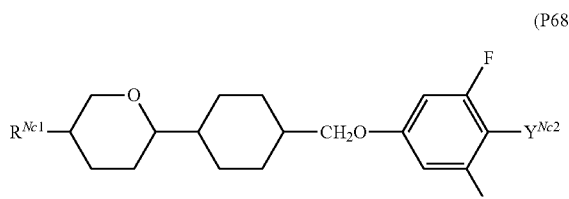
(P69) 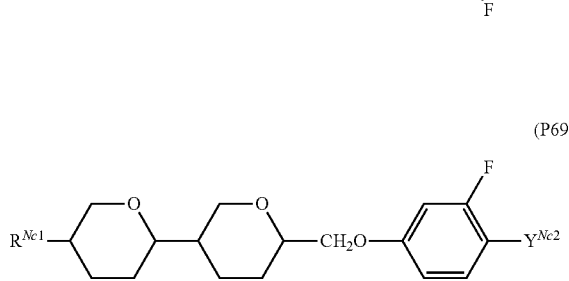
(P70) 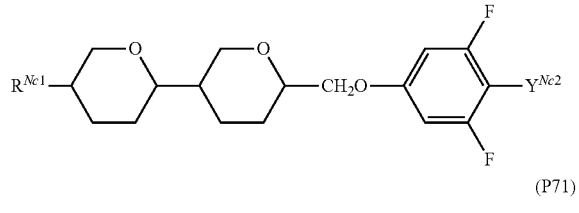
(P71) 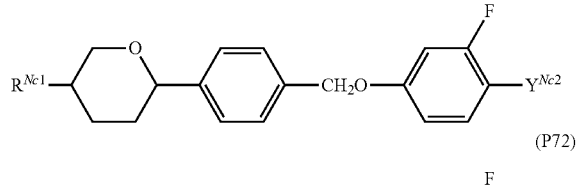
(P72) 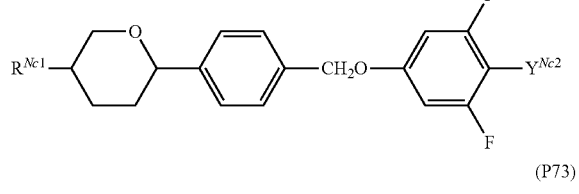
(P73) 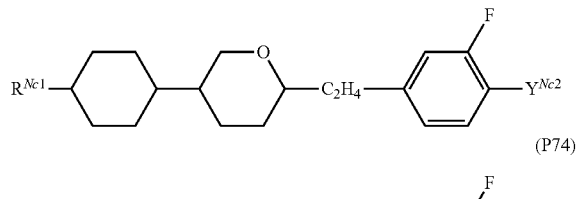
(P74) 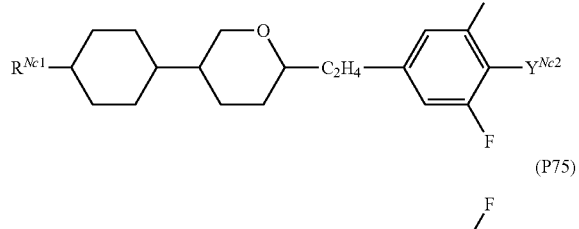
(P75) 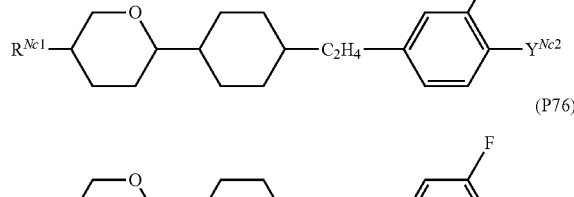
(P76) 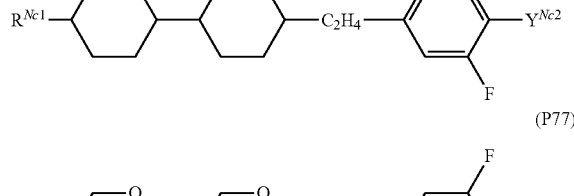
(P77)
(P78) 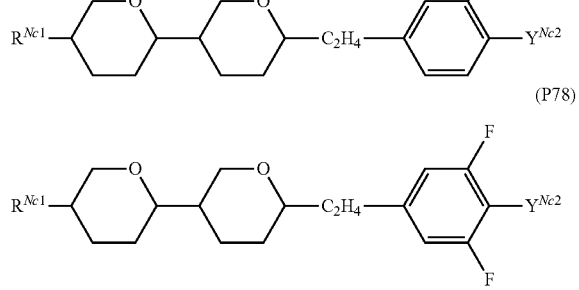

(P79)

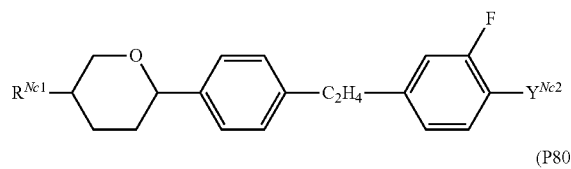

(P80)

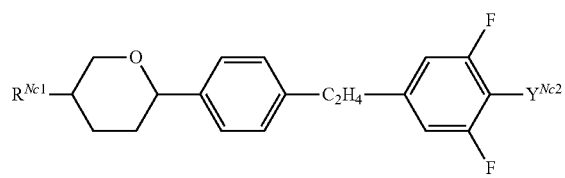

In the above General Formulae (P1) to (P80), $R^{Nc1}$ represents an alkyl group with carbon atom number of 1 to 8, or an alkenyl group with carbon atom number of 2 to 8, in which one or two or more non-adjacent —CH$_2$— in the group may be each independently substituted with —C≡C—, —O—, —CO—, —COO—, or —OCO—. However, it is preferably an alkyl group with carbon atom number of 1 to 5 or an alkenyl group with carbon atom number of 2 to 5.

In the above General Formulae (P1) to (P80), $Y^{Nc2}$ represents a hydrogen atom, a fluorine atom, a chlorine atom, a cyano group, a trifuloromethyl group, a fluoromethoxy group, a difluoromethoxy group, a trifluoromethoxy group, or a 2,2,2-trifluoroethyl group. However, it is preferably a fluorine atom, a trifuloromethyl group, a fluoromethoxy group, a difluoromethoxy group, or a trifluoromethoxy group. It is more preferably a fluorine atom, a trifuloromethyl group, or a trifluoromethoxy group.

As for the compound represented by General Formula (Pa) according to the present invention, the following compounds can be further exemplified.

[Chemical Formula 31]

(I-1.1)

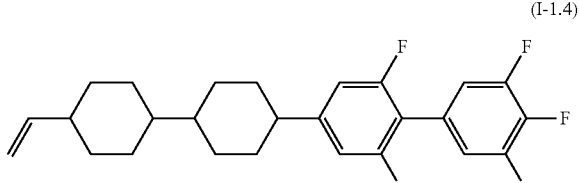

(I-1.2)

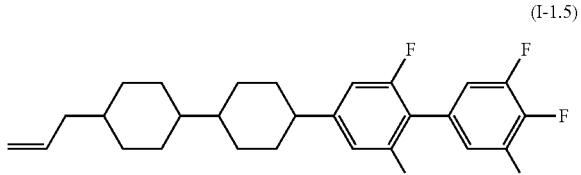

(I-1.3)

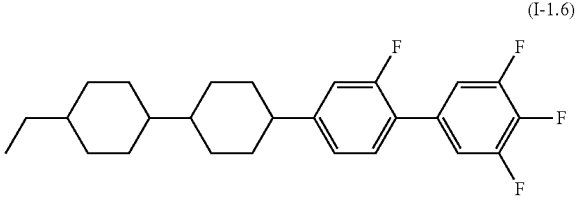

[Chemical Formula 32]

(I-1.4)

(I-1.5)

(I-1.6)

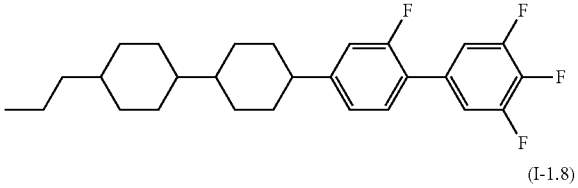

(I-1.7)

(I-1.8)

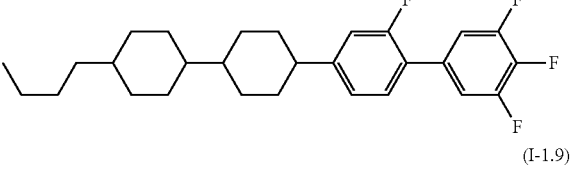

(I-1.9)

(I-1.10)

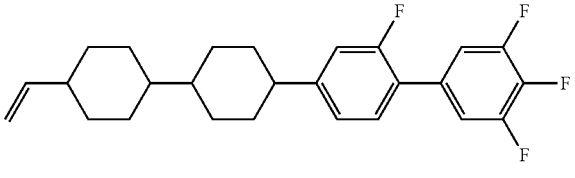

[Chemical Formula 33]

(I-3.1)

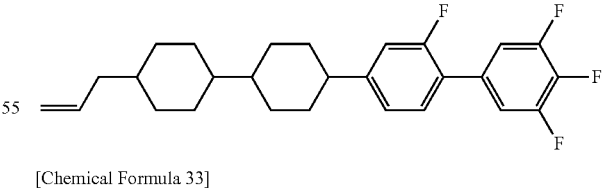

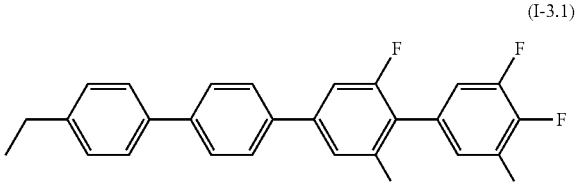

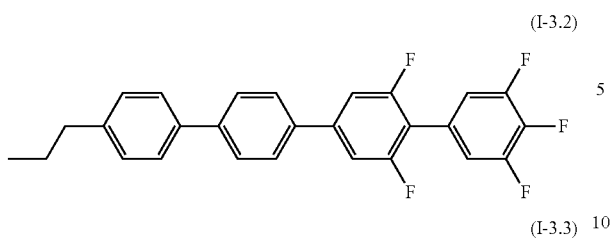
(I-3.2)

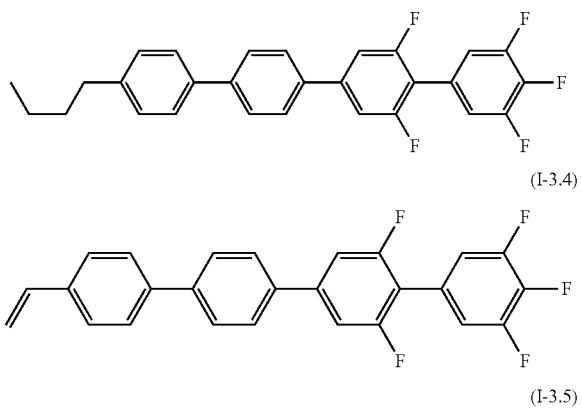
(I-3.3)
(I-3.4)
(I-3.5)

[Chemical Formula 34]

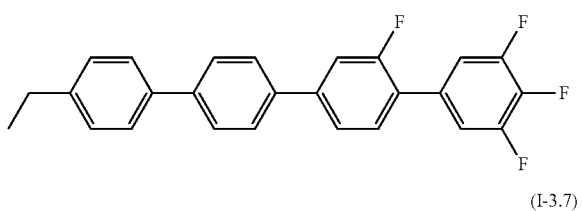
(I-3.6)
(I-3.7)

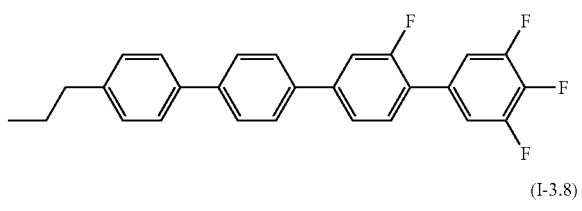
(I-3.8)
(I-3.9)

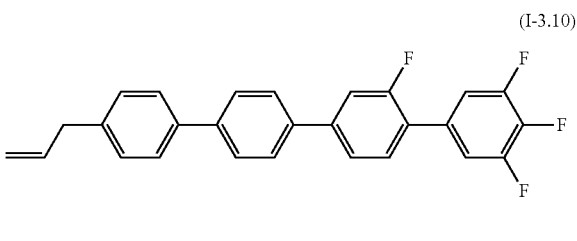
(I-3.10)

The liquid crystal composition according to the present invention may contain, as a third component, a compound having dielectric anisotropy (Δε) of −1 to +1 (preferably, dielectric anisotropy (Δε) of −0.5 to +0.5), in addition to the anti-oxidizing agent or the liquid crystal compound having positive dielectric anisotropy with an absolute value of 4 or higher, As the third component, there is a compound represented by the following General Formula (L).

[Chemical Formula 35]

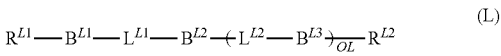
(L)

In the above General Formula (L), $R^{L1}$ and $R^{L2}$ each independently represent an alkyl group with carbon atom number of 1 to 10, or an alkenyl group with carbon atom number of 2 to 10, in which one or two or more non-adjacent —CH$_2$— in the group may be each independently substituted with —CH=CH—, —C≡C—, —O—, —CO—, —COO—, or —OCO—.

In the above General Formula (L), OL represents 0, 1, 2 or 3, but it is preferably 0, 1 or 2.

In the above General Formula (L), $B^{L1}$, $B^{L2}$ and $B^{L3}$ each independently represent a 1,4-cyclohexylene group (one or two or more non-adjacent —CH$_2$— in the group may be substituted with —O— or —S—) or a 1,4-phenylene group (one or two or more non-adjacent —CH= in the group may be substituted with —N= and one or two or more hydrogen atoms in the group may be substituted with a cyano group, a fluorine atom, or a chlorine atom).

In the above General Formula (L), $L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—.

When OL is 2 or 3 and there more than one $L^{L2}$, they may be the same as or different from each other. When OL is 2 or 3 and there more than one $B^{L3}$, they may be the same as or different from each other. The liquid crystal composition according to the present invention preferably contains one or two or more kinds of the compound represented by General Formula (L). It more preferably contains 1 to 20 kinds of the compound. It even more preferably contains 2 to 10 kinds of the compound.

The compound represented by the above General Formula (L) is preferably a compound selected from a compound group represented by General Formula (III-A) to General Formula (III-J).

[Chemical Formula 36]

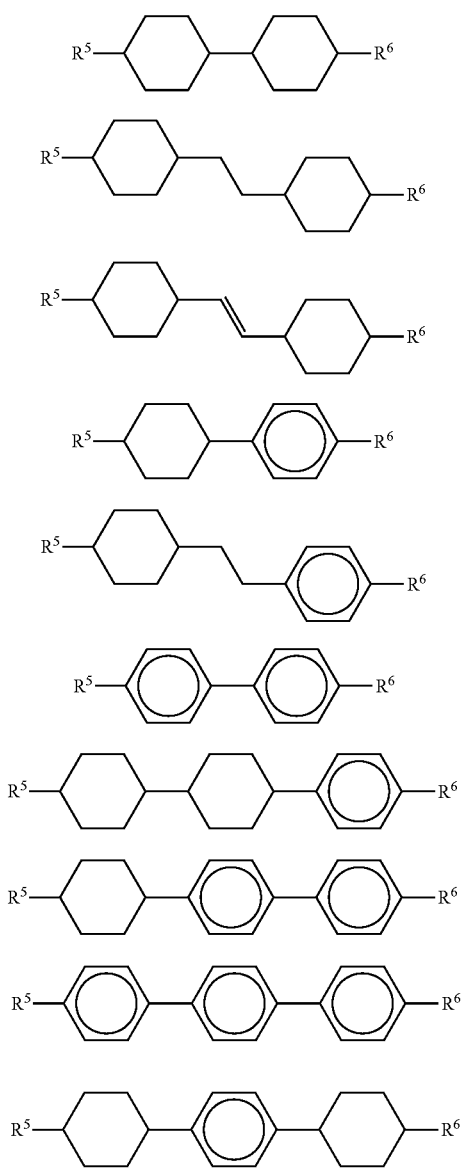

(III-A)
(III-B)
(III-C)
(III-D)
(III-E)
(III-F)
(III-G)
(III-H)
(III-I)
(III-J)

In the above General Formulae (III-A) to (III-J), $R^5$ is preferably an alkyl group with carbon atom number of 1 to 10 or an alkenyl group with carbon atom number of 2 to 10, and more preferably an alkyl group with carbon atom number of 1 to 5 or an alkenyl group with carbon atom number of 2 to 5. $R^6$ is preferably an alkyl group with carbon atom number of 1 to 10, an alkoxyl group with carbon atom number of 1 to 10, an alkenyl group with carbon atom number of 2 to 10, or an alkenyloxy group with carbon atom number of 2 to 10. It is more preferably an alkyl group with carbon atom number of 1 to 5, an alkoxyl group with carbon atom number of 1 to 5, an alkenyl group with carbon atom number of 2 to 5, or an alkenyloxy group with carbon atom number of 2 to 5.

The third component in the liquid crystal composition according to the present invention is more preferably a compound selected from General Formula (III-A), General Formula (III-D), General Formula (III-F), General Formula (III-G), and General Formula (III-H). It is particularly preferably a compound selected from General Formula (III-A), General Formula (III-F), General Formula (III-G), and General Formula (III-H).

Furthermore, with regard to the compound represented by General Formula (III-D), General Formula (III-G), and General Formula (III-H), $R^5$ is preferably an alkyl group with carbon atom number of 1 to 5 or an alkenyl group with carbon atom number of 2 to 5 and $R^6$ is preferably an alkyl group with carbon atom number of 1 to 5 or an alkoxy group with carbon atom number of 1 to 5. With regard to the compound represented by General Formula (III-F), it is preferable that $R^5$ and $R^6$ are each independently an alkyl group with carbon atom number of 1 to 5 or an alkenyl group with carbon atom number of 2 to 5.

The content of the compound represented by General Formula (L) as the third component is preferably 0 to 80% by mass, more preferably 1 to 60% by mass, even more preferably 3 to 60% by mass, and still even more preferably 10 to 60% by mass.

As a compound represented by the above General Formula (L), one or two or more kinds of the compound represented by General Formulae (VIII-c) to General Formula (VIII-e) may be contained.

[Chemical Formula 37]

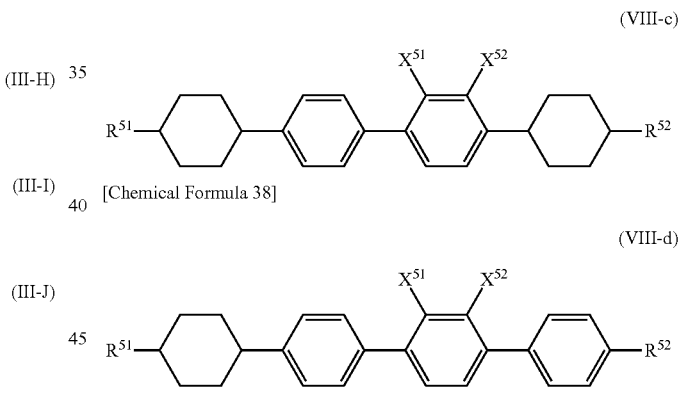

(VIII-c)

[Chemical Formula 38]

(VIII-d)

[Chemical Formula 39]

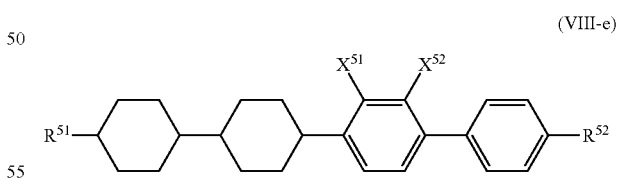

(VIII-e)

In the formula, $R^{51}$ and $R^{52}$ are each independently an alkyl group with carbon atom number of 1 to 5, an alkoxyl group with carbon atom number of 1 to 5, an alkenyl group with carbon atom number of 2 to 5, or an alkenyloxy group with carbon atom number of 2 to 5. $X^{51}$ and $X^{52}$ are each independently a fluorine atom, a chlorine atom, or a hydrogen atom.

More specific examples thereof include a compound of Formula (V-6.1).

[Chemical Formula 40]

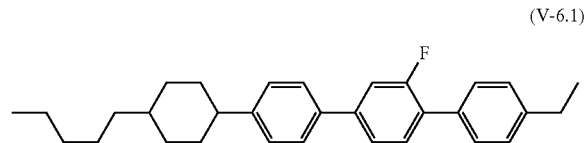

(V-6.1)

As a compound represented by the above General Formula (L), one or two or more kinds of the compound represented by General Formula (V-9.1) to General Formula (V-9.3) may be contained.

[Chemical Formula 41]

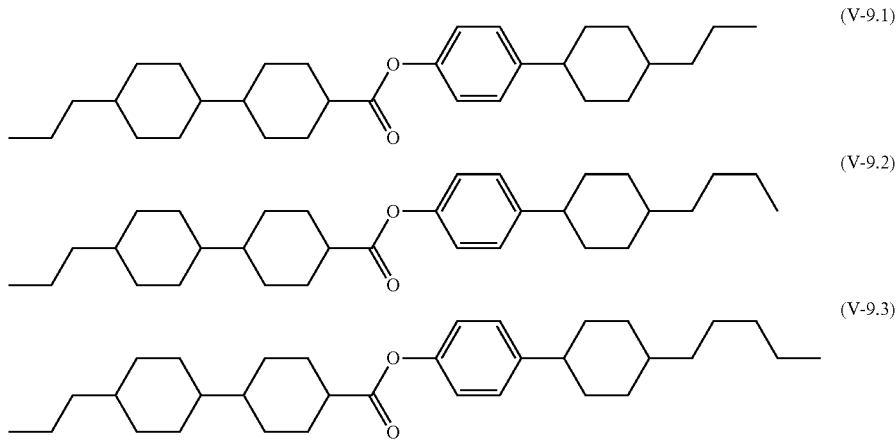

In the liquid crystal composition of the present invention, in order to manufacture a liquid crystal display element of a PS type, a horizontal electric field type PSA type, or a horizontal electric field type PSVA type, a polymerizable compound can be contained. As the polymerizable compound capable of being used, a photopolymerizable monomer which is polymerized by energy rays such as light and has a liquid crystal skeleton in which a plurality of six-membered rings is connected, for example, biphenyl derivatives and terphenyl derivatives, can be exemplified.

For example, it is preferable to contain a polymerizable compound like biphenyl derivatives and terphenyl derivatives in an amount of 0.01 to 2% by mass.

In greater detail, one or two or more kinds of a polymerizable compound represented by the above General Formula (M) are contained in the liquid crystal composition of the present invention.

In General Formula (M), $X^{201}$ and $X^{202}$ each independently represent a hydrogen atom, a methyl group, or a —$CF_3$ group. The diacrylate derivatives in which both $X^{201}$ and $X^{202}$ represent hydrogen atoms and dimethacrylate derivatives in which both $X^{201}$ and $X^{202}$ represent methyl groups are preferable, and compounds in which one of them represents a hydrogen atom, and the other represents a methyl group are also preferable. Although a compound preferred for specific application may be used, in a PSA display element, the polymerizable compound represented by General Formula (M) preferably has at least one dimethacrylate derivative. It is also preferable to have two dimethacrylate derivatives.

$Sp^{201}$ and $Sp^{202}$ each independently represent a single bond, an alkylene group with carbon atom number of 1 to 8, or a —O—$(CH_2)_s$— (in the formula, s is an integer of 2 to 7 and the oxygen atom is bound to a ring). In a liquid crystal display element of PSA type, at least one of $Sp^{201}$ and $Sp^{202}$ is preferably a single bond. It is also preferable to have a compound in which all of them are a single bond or one of them is a single bond and the other is an alkylene group with carbon atom number of 1 to 8, or a —O—$(CH_2)_s$—, and in such case, it is preferably an alkylene group with carbon atom number of 1 to 4 and s is preferably 1 to 4.

The ring $M^{201}$, ring $M^{202}$ and ring $M^{203}$ each independently represent a trans-1,4-cyclohexylene group (one or two or more non-adjacent —$CH_2$— in the group may be substituted with —O— or —S—), a 1,4-phenylene group (one or two or more non-adjacent —CH= in the group may be substituted with —N=), a 1,4-cyclohexylene group, a 1,4-bicyclo[2,2,2]octylene group, a piperidine-1,4-diyl group, a naphthalene-2,6-diyl group, a decahydronaphthalene-2,6-diyl group, or a 1,2,3,4-tetrahydronaphtalene-2,6-diyl group, in which the hydrogen atoms in the group may be each independently substituted with a fluorine atom, a —$CF_3$ group, an alkyl group with carbon atom number of 1

[Chemical Formula 42]

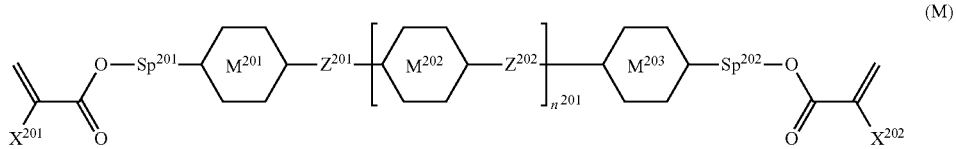

(M)

to 10, an alkoxyl group with carbon atom number of 1 to 10, or any one of Formula (R-1) to Formula (R-15).

[Chemical Formula 43]

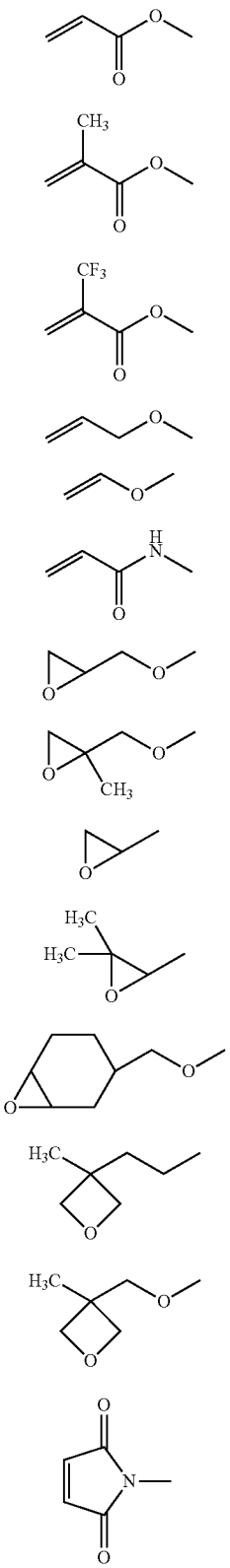

(R-1) (R-2) (R-3) (R-4) (R-5) (R-6) (R-7) (R-8) (R-9) (R-10) (R-11) (R-12) (R-13) (R14)

HS— (R-15)

$Z^{201}$ and $Z^{202}$ each independently represent —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (in the formula, $Y^1$ and $Y^2$ each independently represent a fluorine atom or a hydrogen atom), —C≡C—, or a single bond. However, they are more preferably —COO—, —OCO—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —C≡C—, or a single bond. They are more preferably —COO—, —OCO—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, or a single bond.

$n^{201}$ represents 0, 1, or 2, but it is preferably 0 or 1. Meanwhile, when a plurality of each of the ring $M^{202}$ and $Z^{202}$ are present, each may be the same as or different from each other.

The liquid crystal composition containing a polymerizable compound of the present invention contains at least one kind of the polymerizable compound which is represented by General Formula (M). However, it preferably contains 1 to 5 kinds, and more preferably 1 to 3 kinds. When the content of the polymerizable compound represented by General Formula (M) is low, the force for restricting the alignment of the liquid crystal composition becomes weak. On the other hand, when the content of the polymerizable compound represented by General Formula (M) is excessively high, the energy required for polymerization is increased and the amount of the remaining polymerizable compound without being polymerized is also increased, yielding a cause of having a display defects. Thus, the content is preferably 0.01 to 2.00% by mass, more preferably 0.05 to 1.00% by mass, and particularly preferably 0.10 to 0.50% by mass.

More specifically, when $n^{201}$ is 0 in General Formula (M), the ring structure between $Sp^{201}$ and $Sp^{202}$ preferably has Formula (XXa-1) to Formula (XXa-5). It is more preferable to have Formula (XXa-1) to Formula (XXa-3). It is particularly preferable to have Formula (XXa-1) or Formula (XXa-2). Meanwhile, both ends of the formula should be bonded to $Sp^{201}$ or $Sp^{202}$.

[Chemical Formula 44]

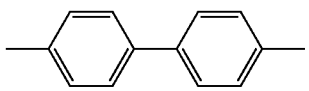

(XXa-1)

[Chemical Formula 45]

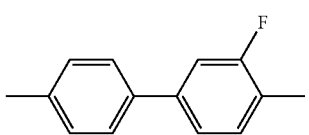

(XXa-2)

[Chemical Formula 46]

(XXa-3)

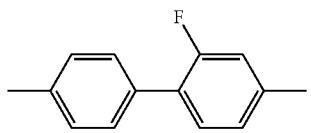

[Chemical Formula 47]

(XXa-4)

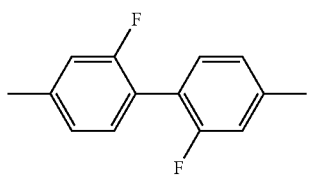

[Chemical Formula 48]

(XXa-5)

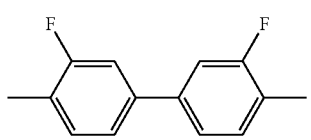

The polymerizable compounds having skeletons as represented by General Formula (M) have a force for restricting the alignment after polymerization which is optimal for a PSA type liquid crystal display element, and as an excellent alignment state is obtained, there is an effect that display unevenness is suppressed or is not generated at all.

Based on the above, as the polymerizable monomer, compounds represented by Formula (XX-1) to General Formula (XX-10) are preferable, and compounds of Formula (XX-1) to Formula (XX-4) are more preferable.

[Chemical Formula 49]

(XX-1)

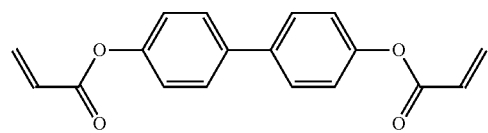

(XX-2)

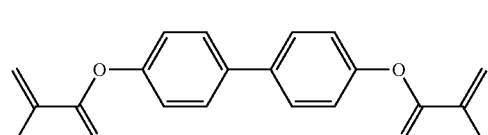

(XX-3)

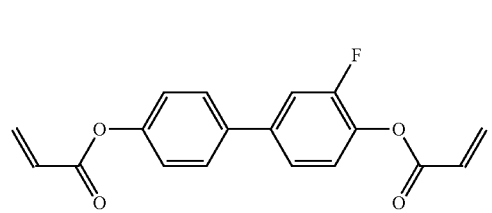

(XX-4)

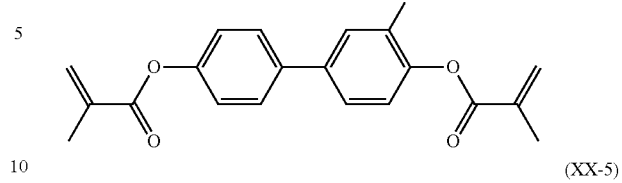

(XX-5)

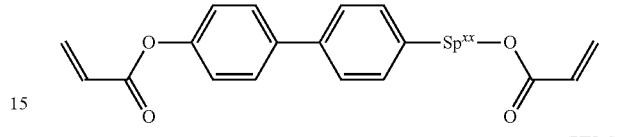

(XX-6)

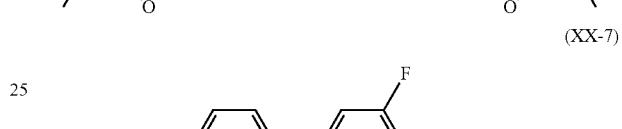

(XX-7)

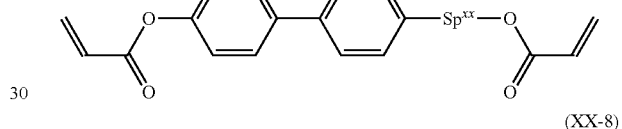

(XX-8)

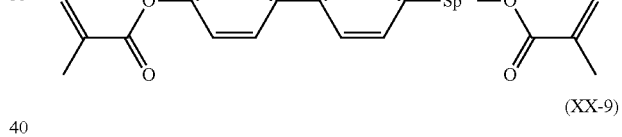

(XX-9)

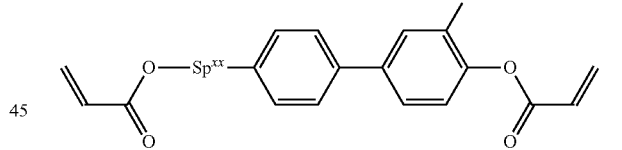

(XX-10)

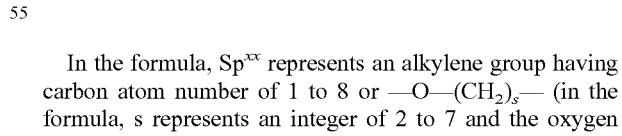

In the formula, $Sp^{xx}$ represents an alkylene group having carbon atom number of 1 to 8 or —O—$(CH_2)_s$— (in the formula, s represents an integer of 2 to 7 and the oxygen atom is bound to a ring).

Furthermore, the hydrogen atom in the phenyl group in the formula may be substituted with —F, —Cl, —$CF_3$, —$CH_3$, or any one of Formula (R-1) to Formula (R-15).

When $n^{201}$ in General Formula (M) is 1, a polymerizable compound like Formula (M31) to Formula (M48) is preferable.

[Chemical Formula 50]
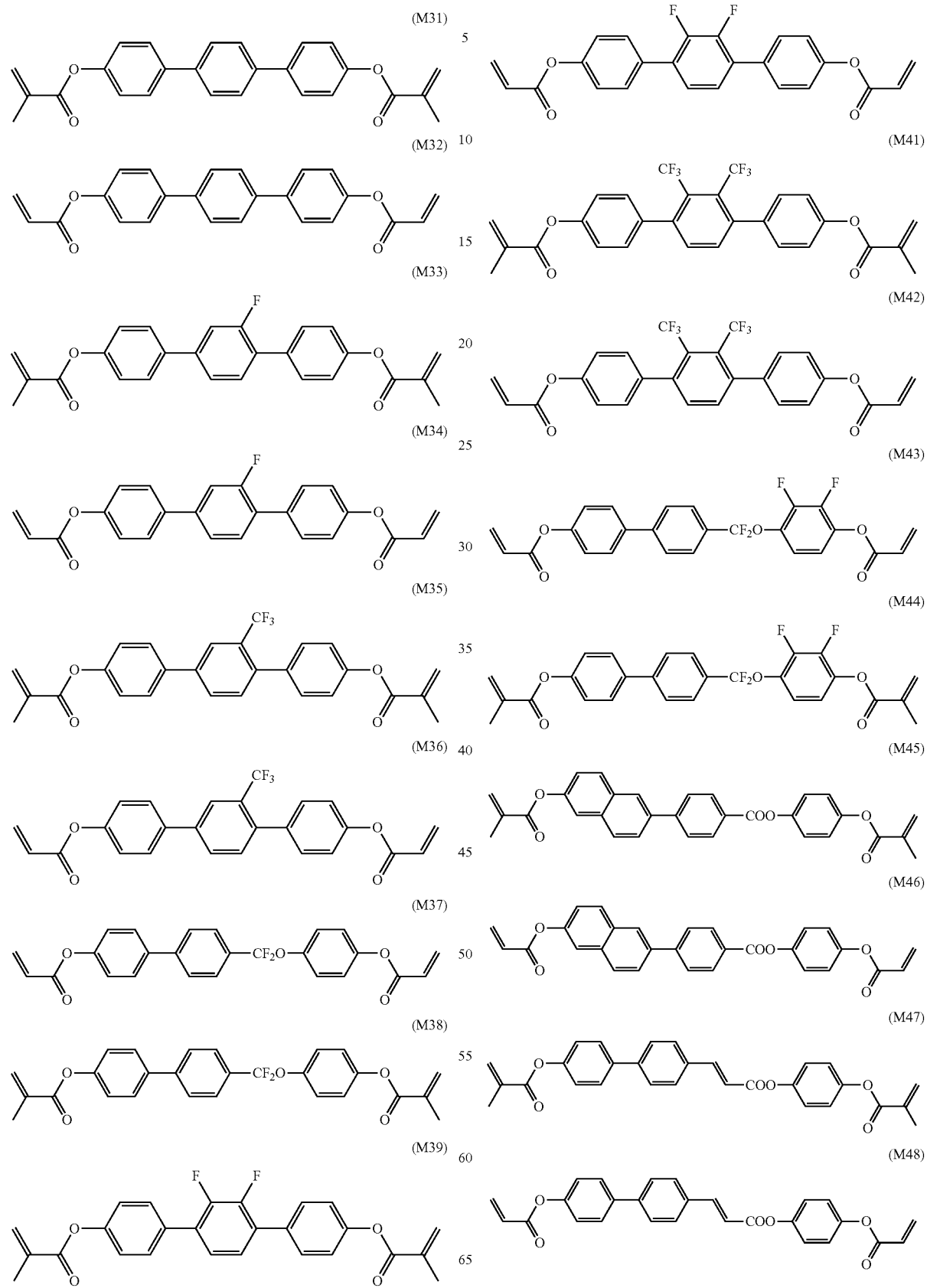

The hydrogen atom in the phenyl group and the naphthalene group in the formula may be substituted with —F, —Cl, —CF$_3$, —CH$_3$, or any one of Formula (R-1) to Formula (R-15).

The polymerizable compounds having skeletons as represented by General Formula (M) have a force for restricting the alignment after polymerization which is optimal for a PSA type liquid crystal display element, and as an excellent alignment state is obtained, there is an effect that display unevenness is suppressed or is not generated at all.

When $n^{201}$ in General Formula (M) is 1 and there is a plurality of Formula (R-1) or Formula (R-2), a polymerizable compound like Formula (M301) to Formula (M316) is preferable.

[Chemical Formula 51]

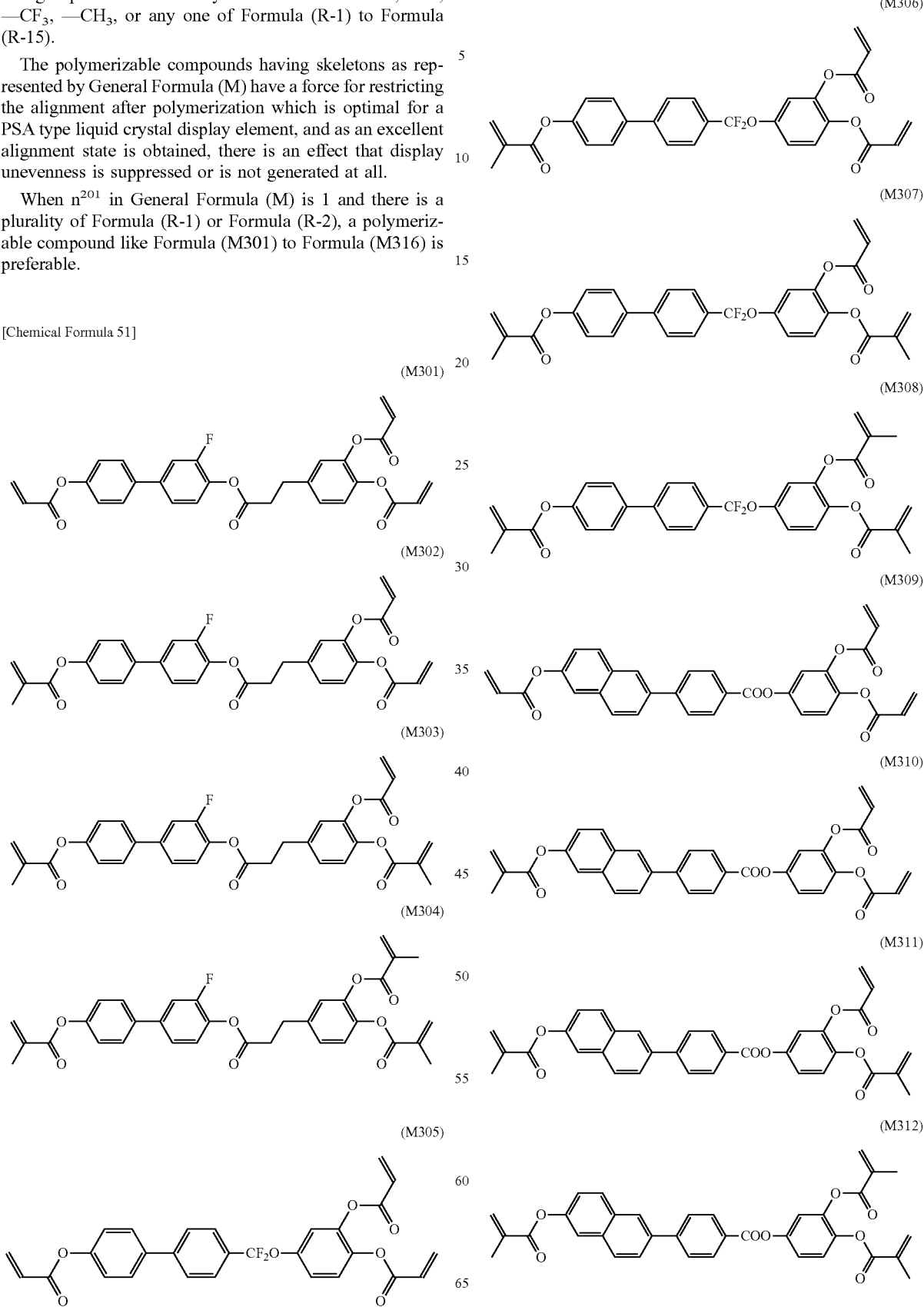

(M313)
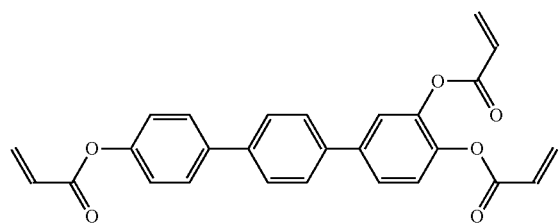
(M314)
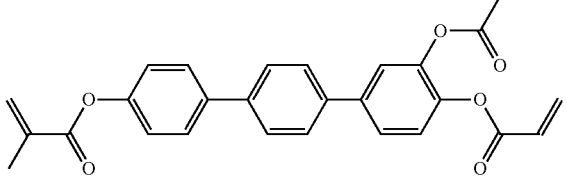
(M315)
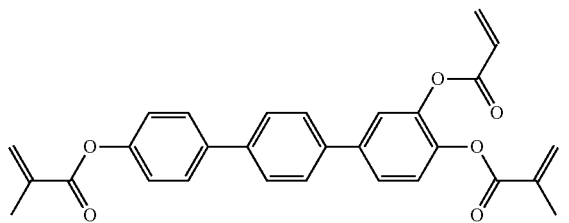
(M316)
The hydrogen atom in the phenyl group and the naphthalene group in the formula may be also substituted with —F, —Cl, —CF$_3$, or —CH$_3$.
As the polymerizable monomer represented by General Formula (M) according to the present invention, polymerizable compounds like Formula (Ia-1) to Formula (Ia-31) are also preferable, for example.
[Chemical Formula 52]
(Ia-1)
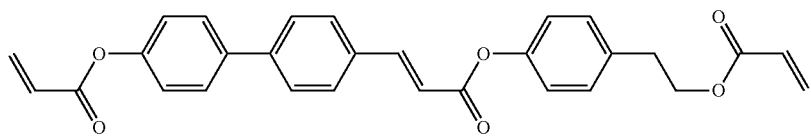
(Ia-2)
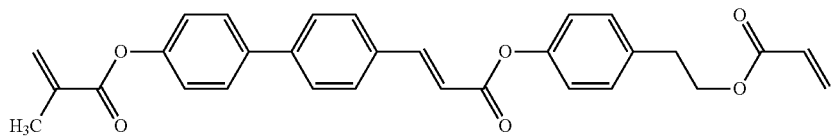
(Ia-3)
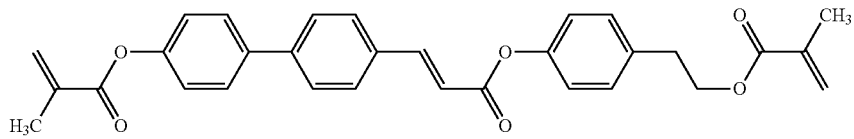
(Ia-4)
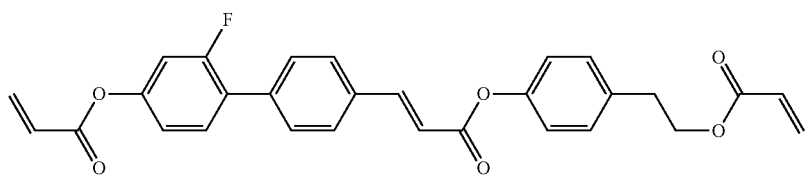
(Ia-5)
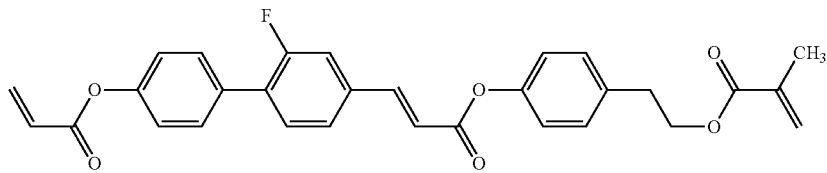

-continued
(Ia-6)
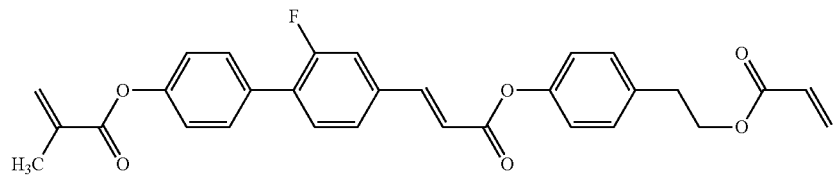
(Ia-7)
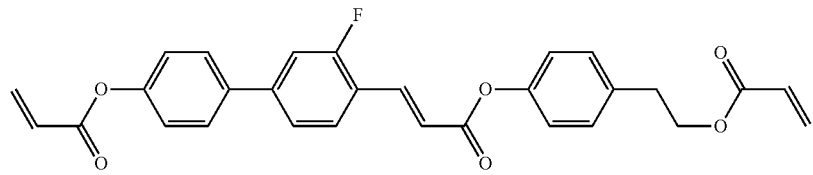
(Ia-8)
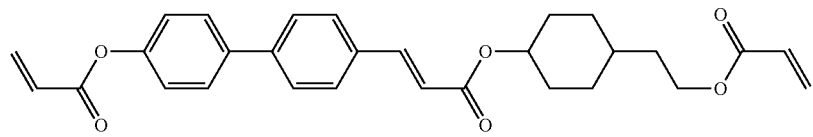
(Ia-9)
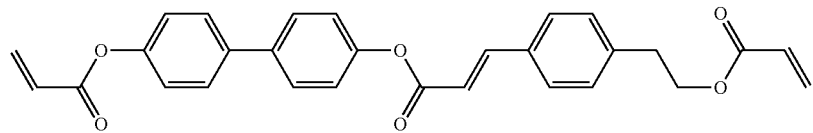
(Ia-10)
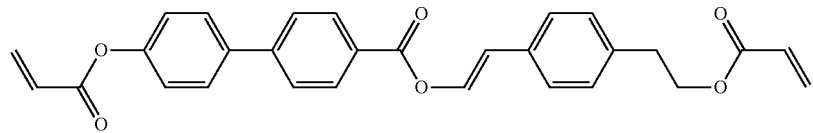
(Ia-11)
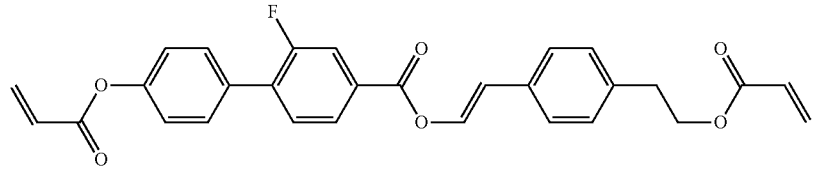
(Ia-12)
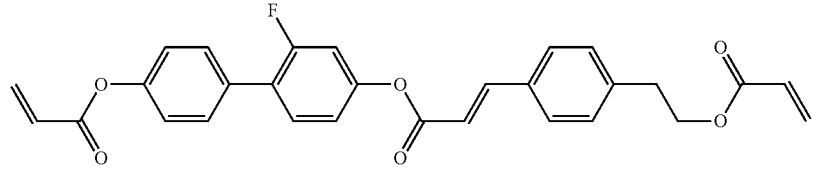
(Ia-13)
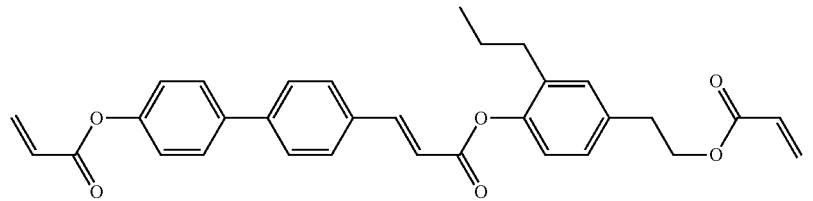
[Chemical Formula 53]
(Ia-14)
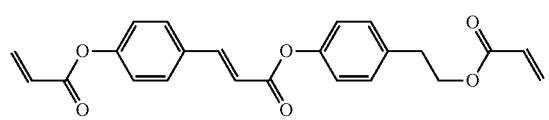
(Ia-15)
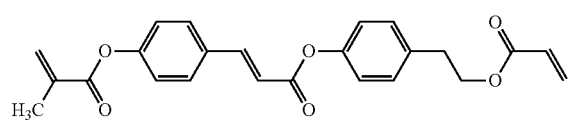

-continued
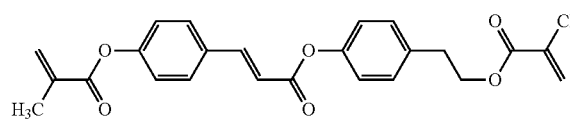 (Ia-16)
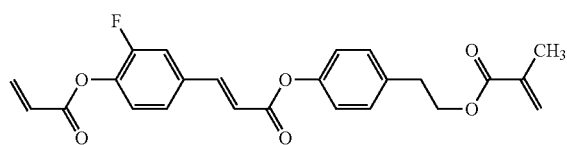 (Ia-17)
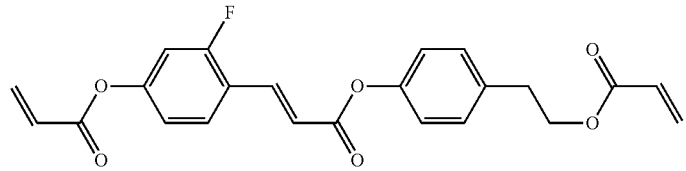 (Ia-18)
[Chemical Formula 54]
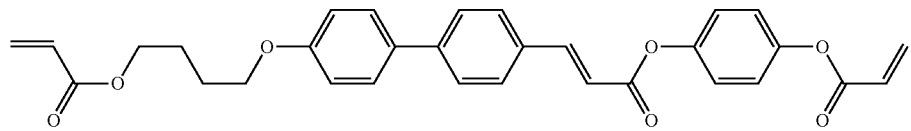 (Ia-19)
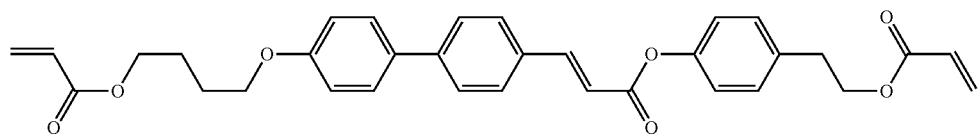 (Ia-20)
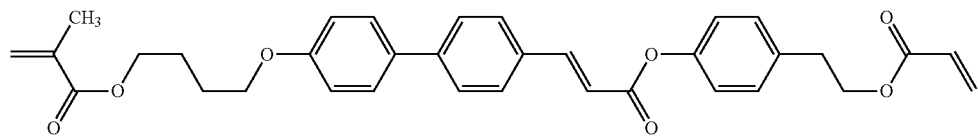 (Ia-21)
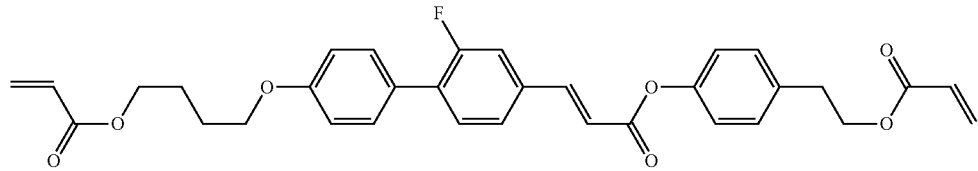 (Ia-22)
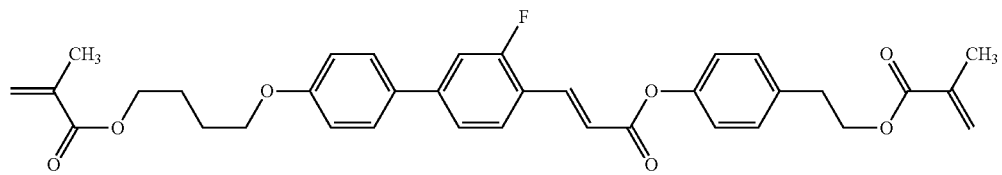 (Ia-23)
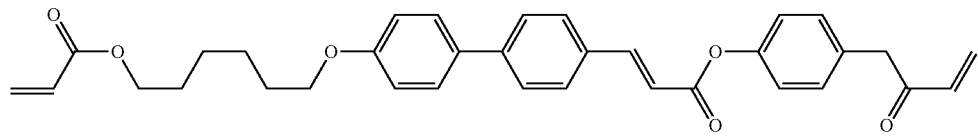 (Ia-24)
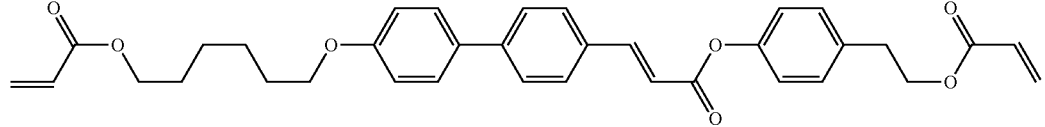 (Ia-25)

-continued

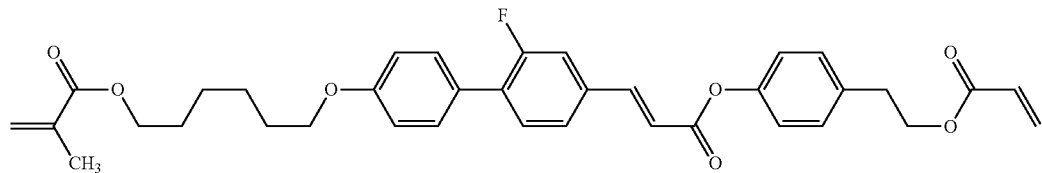
(Ia-26)

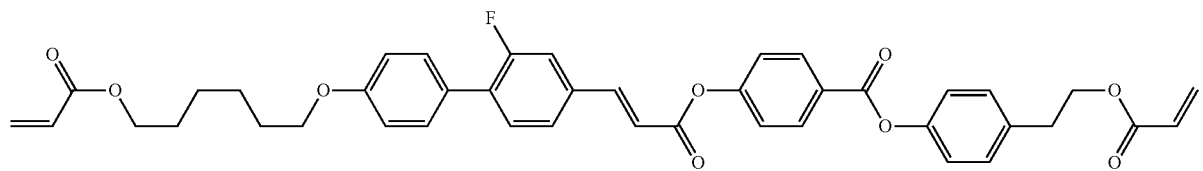
(Ia-27)

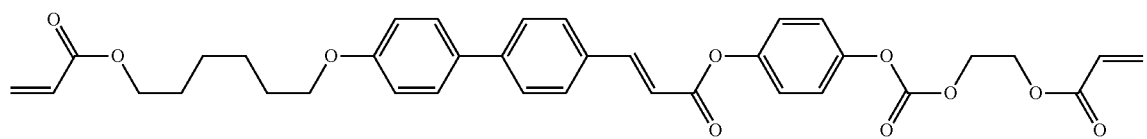
(Ia-28)

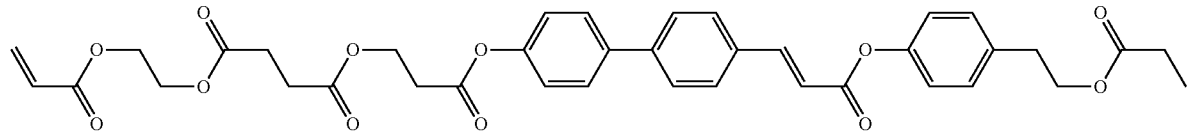
(Ia-29)

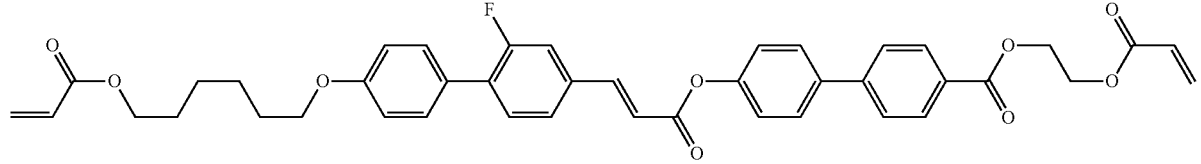
(Ia-30)

[Chemical Formula 55]

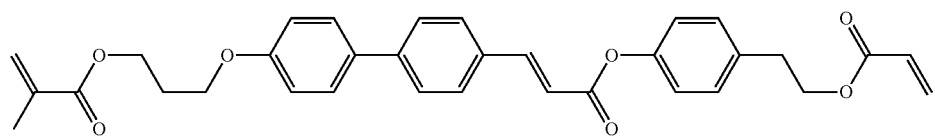
(Ia-31)

The polymerizable compounds having skeletons as represented by General Formula (M) have a force for restricting the alignment after polymerization which is optimal for a PSA type liquid crystal display element, and as an excellent alignment state is obtained, there is an effect that display unevenness is suppressed or is not generated at all.

The liquid crystal composition containing a polymerizable compound which simultaneously contains the first component, the second component, the third component, and General Formula (M) as a polymerizable compound enables obtainment of low viscosity ($\eta$), low rotational viscosity ($\gamma_1$), and high elastic constant ($K_{33}$), and thus high speed response can be achieved by a liquid crystal display element of a PSA type or a PSVA type using the composition.

The liquid crystal display element using the liquid crystal composition of the present invention has significant characteristics of high speed response, and in particular, is useful for the liquid crystal display element for active matrix driving, and can be applied to a liquid crystal display element of a VA type, a PSVA type, a PSA type, an IPS type, or an ECB type.

In the case of adding a polymerizable compound to the liquid crystal composition of the present invention, polymerization proceeds even when a polymerization initiator is not present, however, the polymerization initiator may be contained in order to promote the polymerization. Examples of the polymerization initiator include benzoin ethers, benzophenones, acetophenones, benzyl ketals and acyl phosphine oxides.

The liquid crystal composition of the present invention has 20° C. dielectric anisotropy ($\Delta\varepsilon$) of 2.0 to 20.0. However, it is preferably 4.0 to 18.0, more preferably 4.0 to 16.0, and particularly preferably 4.0 to 14.0.

The liquid crystal composition of the present invention has 20° C. refractive index anisotropy ($\Delta n$) of 0.08 to 0.18. However, it is more preferably 0.09 to 0.15 and particularly preferably 0.09 to 0.12. When explained in greater detail, for a case in which it is to respond to a thin cell gap, it is preferably 0.10 to 0.18. For a case in which it is to respond to a thick cell gap, it is preferably 0.08 to 0.10.

The liquid crystal composition of the present invention has 20° C. viscosity (η) of 10 to 30 mPa·s. However, it is more preferably 10 to 25 mPa·s, and particularly preferably 10 to 20 mPa·s.

The liquid crystal composition of the present invention has 20° C. rotational viscosity ($\gamma_1$) of 50 to 130 mPa·s. However, it is more preferably 50 to 110 mPa·s, and particularly preferably 50 to 90 mPa·s.

The liquid crystal composition of the present invention has a nematic phase-isotropic liquid phase transition temperature ($T_{ni}$) of 60° C. to 120° C. However, it is more preferably 70° C. to 110° C., and particularly preferably 70° C. to 100° C.

Hereinafter, in view of the drawings, a liquid crystal display element of horizontal electric field type is explained as one preferred embodiment of the liquid crystal display element according to the present invention, but the liquid crystal display element according to the present invention is not limited thereto.

Figure 3:
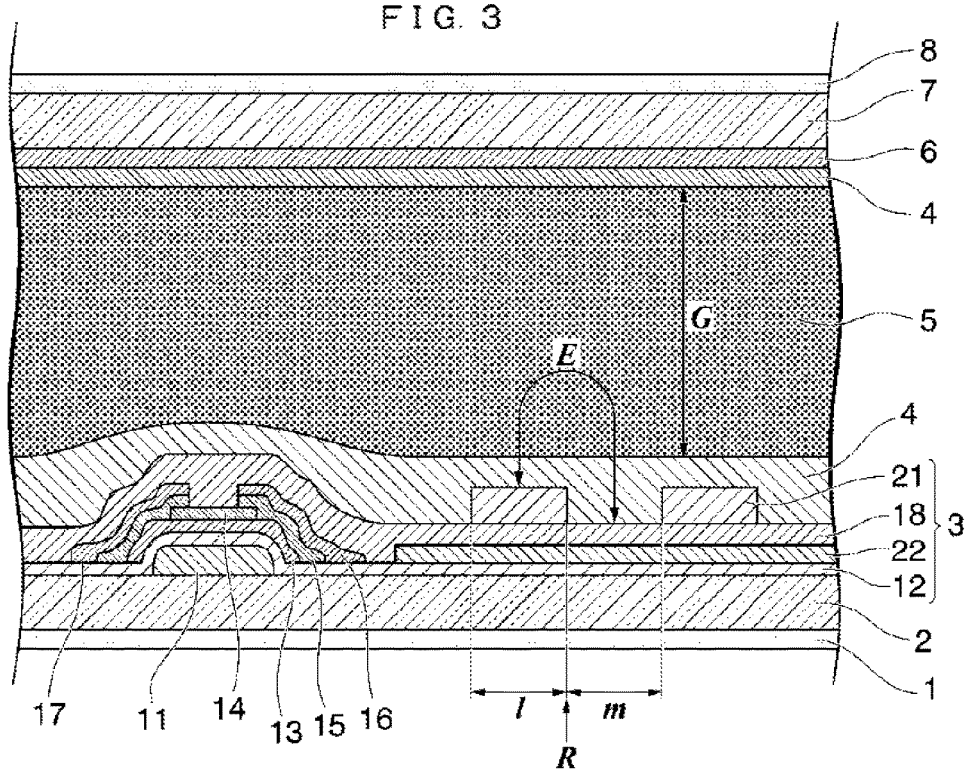
FIG. 3 is a cross-sectional view of the liquid crystal display element shown in FIG. 1, the cross-sectional view being taken along line III-III in FIG. 2.

FIG. 1 schematically shows a structure of a liquid crystal display element. In FIG. 1, components are illustrated in a separated manner for ease of description. As shown in FIG. 1, a liquid crystal display element 10 according to the present invention is a liquid crystal display element of horizontal electric field type (in the drawing, FFS type as an example) including a liquid crystal composition (or a liquid crystal layer 5) sandwiched between a first transparent insulating substrate 2 and a second transparent insulating substrate 7 disposed so as to face each other, which is characterized in that the liquid crystal composition according to the present invention is used as a liquid crystal composition. An electrode layer 3 is formed on a surface of the first transparent insulating substrate 2 on the liquid crystal layer 5 side. A pair of alignment films 4 that are directly in contact with the liquid crystal composition constituting the liquid crystal layer 5 and induce homogeneous alignment are disposed between the liquid crystal layer 5 and the first transparent insulating substrate 2 and between the liquid crystal layer 5 and the second transparent insulating substrate 8. Liquid crystal molecules in the liquid crystal composition are aligned so as to be substantially parallel to the substrates 2 and 7 when no voltage is applied. As shown in FIG. 1 and FIG. 3, the second substrate 7 and the first substrate 2 may be sandwiched between a pair of polarizing plates 1 and 8. In FIG. 1, a color filter 6 is further disposed between the second substrate 7 and the alignment film 4. Furthermore, the liquid crystal display element according to the present invention has the form of so-called color filter-on-array (COA), and a color filter may be formed between an electrode layer containing a thin film transistor and a liquid crystal layer or a color filter may be formed between an electrode layer containing a thin film transistor and the second substrate.

In short, the liquid crystal display element 10 according to the present invention includes the first polarizing plate 1, the first substrate 2, the electrode layer 3 including a thin film transistor, the alignment film 4, the liquid crystal layer 5 containing the liquid crystal composition, the alignment film 4, the color filter 6, the second substrate 7, and the second polarizing plate 8 which are stacked in the order.

The first substrate 2 and the second substrate 7 can be composed of glass or a transparent flexible material such as plastic, and one of the first substrate 2 and the second substrate 7 may be composed of an opaque material such as silicone. Two pieces of the substrates 2 and 7 are bonded to each other with a sealing material or a sealant, such as an epoxy thermosetting composition, disposed in a peripheral region. Further, between them, particulate spacers such as glass particles, plastic particles, or alumina particles or columnar spacers composed of a resin and formed by photolithography may be disposed to maintain the inter-substrate distance.

Figure 2:
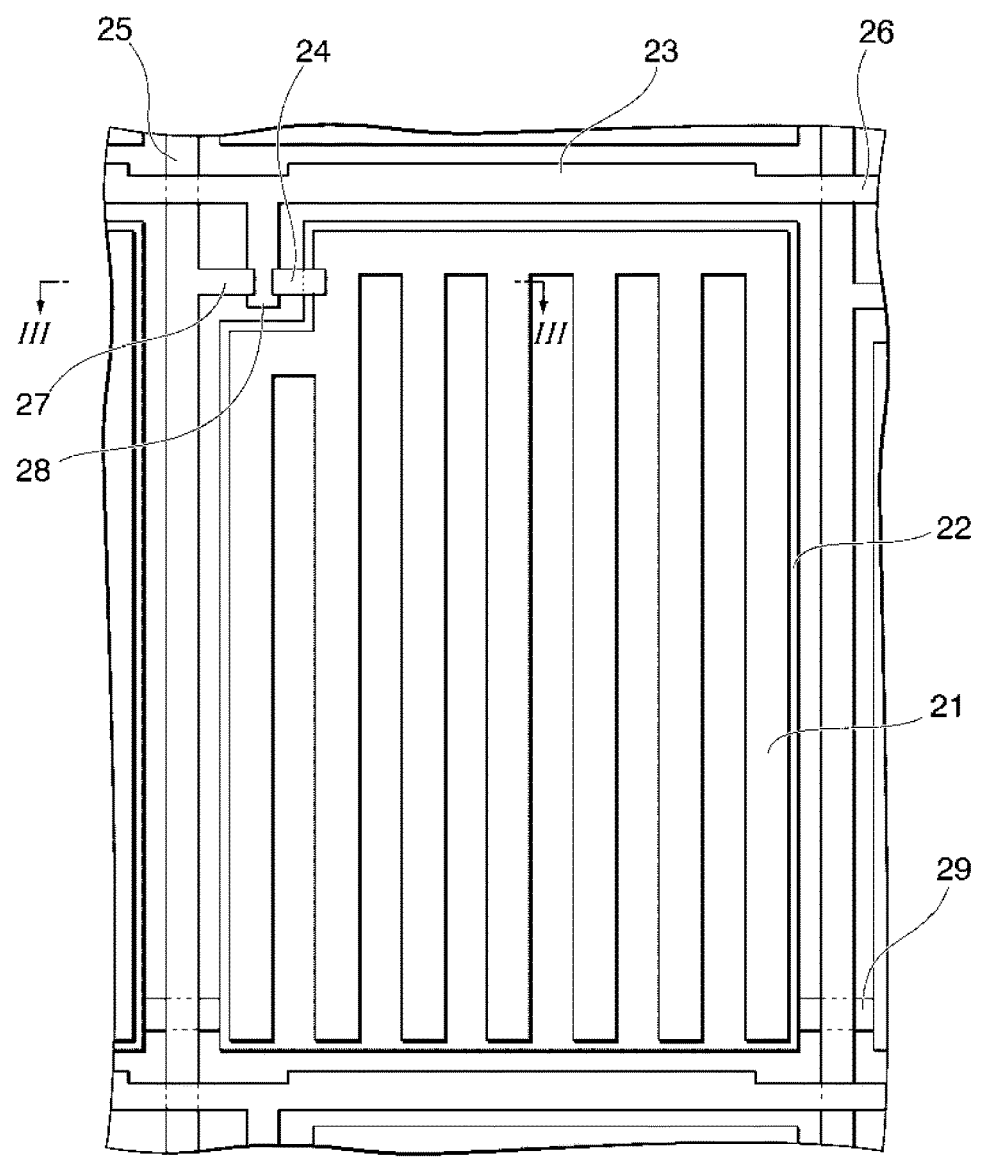
FIG. 2 is an enlarged plane view of a region of an electrode layer II which contains a thin film transistor formed on the substrate of FIG. 1.

FIG. 2 is an enlarged plane view of a region of the electrode layer 3 formed on the substrate 2 in FIG. 1, the region being enclosed by line II. FIG. 3 is a sectional view of the liquid crystal display element shown in FIG. 1, the sectional view being taken along line III-III in FIG. 2. As shown in FIG. 2, the electrode layer 3 including a thin film transistor and formed on the surface of the first substrate 2 includes a plurality of gate bus lines 26 for supplying scanning signals and a plurality of data bus lines 25 for supplying display signals, the gate bus lines 26 and the data bus lines 25 intersecting each other so as to form a matrix. Furthermore, FIG. 2 shows only a pair of gate bus lines 25 and a pair of data bus lines 24.

A unit pixel of the liquid crystal display is formed in each of regions surrounded by the plurality of gate bus lines 26 and the plurality of data bus lines 25. In the unit pixel, a pixel electrode 21 and a common electrode 22 are formed. A thin film transistor including a source electrode 27, a drain electrode 24, and a gate electrode 28 is disposed near the intersection of the gate bus lines 26 and the data bus lines 25. The thin film transistor is connected to the pixel electrode 21 as a switching element for supplying display signals to the pixel electrode 21. Furthermore, a common line 29 is disposed so as to be parallel to the gate bus lines 26. The common line 29 is connected to the common electrode 22 to supply common signals to the common electrode 22.

As shown in FIG. 3, a thin film transistor according to a preferred embodiment includes a gate electrode 11 formed on a surface of a substrate 2, a gate insulating layer 12 disposed so as to cover the gate electrode 11 and substantially the entire surface of the substrate 2, a semiconductor layer 13 formed on a surface of the gate insulating layer 12 so as to face the gate electrode 11, a protective film 14 disposed so as to cover part of a surface of the semiconductor layer 17, a drain electrode 16 disposed so as to cover one-side portions of the protective film 14 and the semiconductor layer 13 and so as to be in contact with the gate insulating layer 12 formed on the surface of the substrate 2, a source electrode 17 disposed so as to cover the other-side portions of the protective film 14 and the semiconductor layer 13 and so as to be in contact with the gate insulating layer 12 formed on the surface of the substrate 2, and an insulating protective layer 18 disposed so as to cover the drain electrode 16 and the source electrode 17. A positive electrode oxide film (not shown) may be formed on a surface of the gate electrode 11 for the purpose of, for example, removing a difference in level compared to the gate electrode.

The semiconductor layer 13 may be composed of amorphous silicon, polycrystalline polysilicon, or the like. It is preferable to use a transparent semiconductor film composed of, for example, ZnO, IGZO (In—Ga—Zn—O), or ITO because harmful effects of photocarriers due to light absorption can be suppressed and the aperture ratio of an element can be increased.

An ohmic contact layer 15 may be disposed between the semiconductor layer 13 and the drain electrode 16 or the source electrode 17 in order to decrease the width and height of a Schottky barrier. The ohmic contact layer may be composed of a material to which an impurity such as phosphorus is added in a high concentration, for example, n type amorphous silicon or n type polycrystalline polysilicon.

The gate bus lines 26, the data bus lines 25, and the common line 29 are preferably metal films. The metal films are preferably composed of Al, Cu, Au, Ag, Cr, Ta, Ti, Mo, W, Ni, or an alloy thereof, and it is more preferable to use a wire of Al or an Al alloy. Furthermore, the insulating protective layer 18 is a layer having an insulating function and is formed of silicon nitride, silicon dioxide, or silicon oxynitride.

In the embodiment shown in FIG. 2 and FIG. 3, the common electrode 22 is a plate-shaped electrode formed on substantially the entire surface of the gate insulating layer 12 whereas the pixel electrode 21 is a comb-shaped electrode formed on the insulating protective layer 18 that covers the common electrode 22. In other words, the common electrode 22 is disposed so as to be closer to the first substrate 2 than the pixel electrode 21, and these electrodes overlap each other with the insulating protective layer 18 disposed therebetween. The pixel electrode 21 and the common electrode 22 are formed of a transparent conductive material such as ITO (indium tin oxide), IZO (indium zinc oxide), or IZTO (indium zinc tin oxide). Since the pixel electrode 21 and the common electrode 22 are formed of a transparent conductive material, the opening area in a unit pixel area is increased, and the aperture ratio and the transmittance are also increased.

For forming a fringe electric field between the pixel electrode 21 and the common electrode 22, the pixel electrode 21 and the common electrode 22 are formed so that the inter-electrode distance: R (also referred to as minimum spacing distance) between the pixel electrode 21 and the common electrode 22 is smaller than the distance: G between the first substrate 2 and the second substrate 7. Note that the inter-electrode distance: R indicates a distance between the electrodes in a direction horizontal to the substrates. FIG. 3 shows an example in which the inter-electrode distance: R is 0 because the plate-shaped common electrode 22 and the comb-shaped pixel electrode 21 overlap each other. To have the minimum spacing distance: R that is smaller than the distance (cell gap) G between the first substrate 2 and the second substrate 7, the fringe electric field E is formed. Thus, in an FFS type liquid crystal display element, a horizontal electric field formed in a direction perpendicular to lines that form a comb-like shape of the pixel electrode 21 and a parabolic electric field can be used. The electrode width: l of a comb-shaped portion of the pixel electrode 21 and the width: m of a gap between comb-shaped portions of the pixel electrode 21 are preferably set in such a manner that all liquid crystal molecules in the liquid crystal layer 5 are driven by the generated electric field. Furthermore, the minimum spacing distance R between the pixel electrode and common electrode can be also adjusted based on (average) film thickness of the gate insulating layer 12. Furthermore, unlike FIG. 3, the liquid crystal display element according to the present invention can be also formed such that the inter-electrode distance: R (also referred to as minimum spacing distance) between the pixel electrode 21 and the common electrode 22 is larger than the distance: G between the first substrate 2 and the second substrate 7 (IPS type). Examples of such case include a structure in which a comb-shaped pixel electrode and a comb-shaped common electrode are approximately formed in an alternating manner in the same plane.

The liquid crystal display element according to the present invention preferably has a liquid crystal display composition of FFS type using a fringe electric field, and as the minimum spacing distance d adjacent to the common electrode 22 and the pixel electrode 21 is shorter than the minimum spacing distance D between the alignment films 4 (inter-substrate distance), a fringe electric field is formed between the common electrode and pixel electrode so that the alignment of liquid crystal molecules both in horizontal direction and vertical direction can be efficiently utilized. In a liquid crystal display element of FFS type like the preferred embodiment of the present invention, when voltage is applied to liquid crystal molecules which are disposed such that the long axis direction is parallel to the alignment direction, an arc-like equipotential line of the electric field is formed between the pixel electrode 21 and the common electrode 22, as high as the top of the pixel electrode 21 and the common electrode 22. Thus, the long axis of the liquid crystal molecules within the liquid crystal layer 5 is aligned along the formed electric field. In particular, in the liquid crystal composition according to the present invention, the long axis of the liquid crystal molecules is aligned along the generated electric field for utilization of the liquid crystal molecules which have a positive dielectric anisotropy.

In the color filter 6, a black matrix (not shown) is preferably formed in regions corresponding to the thin film transistor and a storage capacitor 23 from the viewpoint of preventing the leakage of light.

A pair of alignment films 4 that induce homogeneous alignment are disposed on the electrode layer 3 and the color filter 6 so as to be directly in contact with the liquid crystal composition constituting the liquid crystal layer 5.

The polarizing plate 1 and the polarizing plate 8 can be adjusted so that a satisfactory viewing angle and a high contrast are achieved by adjusting the polarization axis of each of the polarizing plates. They preferably have transmission axes that are perpendicular to each other so that a display element is operated in a normally black mode. In particular, one of the polarizing plate 1 and the polarizing plate 8 is preferably disposed so as to have a transmission axis parallel to the alignment direction of the liquid crystal molecules 30. The product of the refractive index anisotropy Δn of the liquid crystal and the cell thickness d is preferably adjusted so that the contrast is maximized. Furthermore, a phase difference film may be used to increase the viewing angle.

EXAMPLES

The present invention will now be described below in detail based on Examples, but is not limited to Examples. In the compositions of Examples and Comparative Examples below, "%" means "% by mass."

The properties that were measured in Examples are as follows.

$T_{ni}$: nematic phase-isotropic liquid phase transition temperature (° C.)

Δn: refractive index anisotropy at 20° C.

Δε: dielectric anisotropy at 20° C.

η: viscosity (mPa·s) at 20° C.

γ1: rotational viscosity (mPa·s) at 20° C.

RT: response rate (msec) at 20° C. (VA cell with cell thickness of 3.5 μm)

VHR (Init): voltage holding ratio (%) at 60° C. under conditions including a frequency of 60 Hz and an applied voltage of 1 V VHR (HEAT): voltage holding ratio (%) at 60° C. under conditions including a frequency of 60 Hz and an applied voltage of 1 V, which is measured after keeping for 48 hours at 100° C.

Drop mark: Drop mark evaluation for the liquid crystal display element was performed, on the basis of the four-level evaluation below, by visually evaluating a drop mark that appeared white on a black screen.
⊙: No drop mark was observed.
○: Faint drop mark was observed but the degree of the drop mark was acceptable.
Δ: Drop mark was observed and the degree of the drop mark was unacceptable.
x: Very poor drop mark was observed.

Line afterimage: Line afterimage evaluation for the liquid crystal display element was performed after displaying a particular fixed pattern in a display area for 2000 hours, and visually evaluating, on the basis of the four-level evaluation below, the degree of the line-shaped afterimage occurring in a marginal region of the fixed pattern.
⊙: No line afterimage was observed.
○: Faint line afterimage was observed but the degree of the afterimage was acceptable.
Δ: Line afterimage was observed and the degree of the afterimage was unacceptable.
x: Line afterimage at significantly poor level.

(Side Chain)

| | | |
|---|---|---|
| -F | —F | fluorine atom |
| F- | —F | fluorine atom |
| -n | —$C_nH_{2n+1}$ | linear alkyl group having carbon atom number of n |
| n- | $C_nH_{2n+1}$— | linear alkyl group having carbon atom number of n |
| -On | —$OC_nH_{2n+1}$ | linear alkoxyl group having carbon atom number of n |
| nO- | $C_nH_{2n+1}O$— | linear alkoxyl group having carbon atom number of n |
| -V | —CH=$CH_2$ | |
| V- | $CH_2$=CH— | |
| -V1 | —CH=CH—$CH_3$ | |
| 1V- | $CH_3$—CH=CH— | |
| -2V | —$CH_2$—$CH_2$—CH=$CH_3$ | |
| V2- | $CH_3$—CH=$CH_2$—$CH_2$— | |
| -2V1 | —$CH_2$—$CH_2$—CH=CH—$CH_3$ | |
| 1V2- | $CH_3$—CH=CH—$CH_2$—$CH_2$ | |

(Linking Group)
—CF2O— —$CF_2$—O—
—OCF2- —O—$CF_2$—
-1O— —$CH_2$—O—
—O1- —O—$CH_2$—
—COO— —COO—

(Ring Structure)

[Chemical Formula 56]

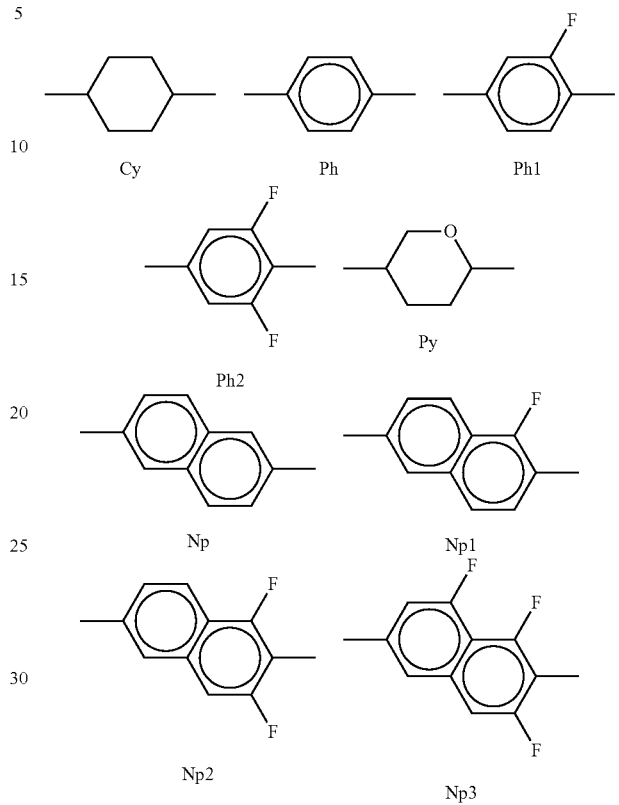

Example 1, Comparative Example 1, and Comparative Example 2

The liquid crystal composition LC-1 (Example 1), liquid crystal composition LC-A (Comparative example 1) and liquid crystal composition LC-B (Comparative example 2) were prepared, and as a result of measuring the physical properties, measuring VHR (Init) and VHR (HEAT), and determining the presence or absence of drop mark and line afterimage, the results as described below are obtained.

TABLE 1

| | | Example 1 LC-1 | Comparative example 1 LC-A | Comparative example 2 LC-B |
|---|---|---|---|---|
| Anti-oxidizing agent | Formula (II-a8) | 0.02 | — | — |
| Anti-oxidizing agent | Formula (St-1) | — | 0.02 | — |
| Anti-oxidizing agent | Formula (St-2) | — | — | 0.02 |
| 2-Ph2-O1-Cy-Ph2-Ph2-F | General formula (K) | 2 | 2 | 2 |
| 3-Ph2-O1-Cy-Ph2-Ph2-F | General formula (K) | 2 | 2 | 2 |
| 4-Ph2-O1-Cy-Ph2-Ph2-F | General formula (K) | 2 | 2 | 2 |
| 5-Ph2-O1-Cy-Ph2-Ph2-F | General formula (K) | 2 | 2 | 2 |
| 3-Cy-Cy-2 | General formula (III-A) | 6.98 | 6.98 | 6.98 |
| 3-Cy-Cy-V | General formula (III-A) | 6 | 6 | 6 |
| 3-Ph-Ph-1 | General formula (III-F) | 3 | 3 | 3 |
| 5-Ph-Ph-1 | General formula (III-F) | 10 | 10 | 10 |
| V-Cy-Cy-Ph-1 | General formula (III-G) | 4 | 4 | 4 |
| 3-Cy-Cy-Ph-1 | General formula (III-G) | 4 | 4 | 4 |
| 3-Cy-Cy-Ph-3 | General formula (III-G) | 4 | 4 | 4 |
| 3-Cy-Ph-Ph-2 | General formula (III-H) | 2 | 2 | 2 |

TABLE 1-continued

|  |  | Example 1 LC-1 | Comparative example 1 LC-A | Comparative example 2 LC-B |
|---|---|---|---|---|
| V-Cy-Ph-Ph-3 | General formula (III-H) | 6 | 6 | 6 |
| 2-Cy-Cy-Ph1-F | General formula (Pa) | 17 | 17 | 17 |
| 3-Cy-Cy-Ph1-F | General formula (Pa) | 17 | 17 | 17 |
| 2-Cy-Cy-Ph-Ph1-F | General formula (Pa) | 4 | 4 | 4 |
| 3-Cy-Cy-Ph-Ph1-F | General formula (Pa) | 4 | 4 | 4 |
| 4-Cy-Cy-Ph-Ph1-F | General formula (Pa) | 4 | 4 | 4 |
| Total |  | 100 | 100 | 100 |
| Tni [° C.] |  | 103.4 | 103.2 | 103.3 |
| Tcn [° C.] |  | −22 | −22 | −22 |
| Δn |  | 0.109 | 0.109 | 0.109 |
| η [mPa · s] |  | 20.4 | 20.4 | 20.4 |
| γ1 [mPa · s] |  | 125 | 124 | 126 |
| Δε |  | 5.0 | 5.0 | 5.0 |
| VHR (Init) |  | 99.9 | 99.8 | 99.8 |
| VHR (HEAT) |  | 99.9 | 99.5 | 99.7 |
| Drop mark |  | ⊙ | ○ | ○ |
| Line afterimage |  | ○ | X | Δ |

Furthermore, the anti-oxidizing agents (St-1) and (St-2) are compounds represented as follows.

[Chemical Formula 57]

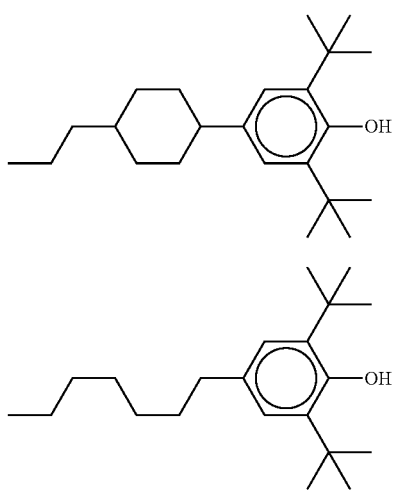

A significant difference was found in terms of VHR (HEAT), presence or absence of drop mark, and line afterimage. Based on these results, it was determined that the liquid crystal composition LC-1 of the present invention has a liquid crystal phase in a broad temperature range, low viscosity, and high specific resistance or voltage holding ratio due to good solubility at low temperature, and it is a liquid crystal composition which is stable against heat or light and has a positive Δε. Thus, a liquid crystal display element using the composition can have excellent display quality and hardly exhibits an occurrence of display defects like drop mark or line afterimage.

Example 2 and Example 3

The liquid crystal composition LC-2 (Example 2) and liquid crystal composition LC-3 (Example 3) were prepared, and as a result of measuring the physical properties, measuring VHR (Init) and VHR (HEAT), and determining the presence or absence of drop mark and line afterimage, the results as described below are obtained.

TABLE 2

|  |  | Example 2 LC-2 | Example 3 LC-3 |
|---|---|---|---|
| Anti-oxidizing agent | Formula (II-a8) | 0.01 | 0.03 |
| Anti-oxidizing agent | Formula (II-a9) | 0.01 | — |
| 2-Ph2-O1-Cy-Ph2-Ph2-F | General formula (K1) | 8 | 8 |
| 3-Ph2-O1-Cy-Ph2-Ph2-F | General formula (K1) | 5 | 5 |
| 4-Ph2-O1-Cy-Ph2-Ph2-F | General formula (K1) | 2 | 2 |
| 5-Ph2-O1-Cy-Ph2-Ph2-F | General formula (K1) | 5 | — |
| 2-Ph2-O1-Cy-Ph2-Np2-F | General formula (K2) | — | 2 |
| 3-Ph2-O1-Cy-Ph2-Np2-F | General formula (K2) | — | 3 |
| 3-Ph-Ph1-Ph2-CF2O-Np2-F | General formula (N3) | — | 3 |
| 4-Ph-Ph1-Ph2-CF2O-Np2-F | General formula (N3) | — | 3 |
| 2-Ph-Ph1-CF2O-Np2-F | General formula (N3) | — | 3 |
| 3-Ph-Ph1-CF2O-Np2-F | General formula (N3) | 13 | 4 |
| 3-Cy-Cy-V | General formula (III-A) | 29.98 | 38.97 |
| 3-Cy-Cy-V1 | General formula (III-A) | 9 | — |
| 3-Ph-Ph-1 | General formula (III-F) | — | 5 |
| 5-Ph-Ph-1 | General formula (III-F) | 5 | — |
| 3-Cy-Cy-Ph-1 | General formula (III-G) | 5 | 5 |
| V-Cy-Ph-Ph-3 | General formula (III-H) | 5 | 5 |
| 3-Cy-Cy-COO-Ph-Cy-3 | Formula (V-9.1) | — | 3 |
| 3-Cy-Cy-Ph1-F | General formula (Pa) | 12 | 10 |
| 3-Cy-Cy-Ph-Ph1-F | General formula (Pa) | 1 | — |
| Total |  | 100 | 100 |
| Tni [° C.] |  | 71.3 | 81.4 |
| Tcn [° C.] |  | −42 | −45 |
| Δn |  | 0.100 | 0.108 |
| η [mPa · s] |  | 14.8 | 15.7 |
| γ1 [mPa · s] |  | 112 | 129 |
| Δε |  | 10.3 | 10.5 |
| VHR (Init) |  | 99.9 | 99.8 |
| VHR (HEAT) |  | 99.8 | 99.8 |
| Drop mark |  | ⊙ | ⊙ |
| Line afterimage |  | ○ | ○ |

It was found the VHR (Init) and VHR (HEAT) are sufficiently high, a drop mark is not present, and a line afterimage is not present. Based on these results, it was determined that the liquid crystal compositions LC-2 and LC-3 of the present invention have a liquid crystal phase in a broad temperature range, low viscosity, and high specific resistance or voltage holding ratio due to good solubility at low temperature, and they are a liquid crystal composition which is stable against heat or light and has a positive Δε. Thus, a liquid crystal display element using the composition can have excellent display quality and hardly exhibits an occurrence of display defects like drop mark or line afterimage.

REFERENCE SIGNS LIST 1, 8 polarizing plate
2 first substrate
3 electrode layer
4 alignment film
5 liquid crystal layer
6 color filter
6G color filter green
6R color filter red
7 second substrate
11 gate electrode
12 gate insulating layer
13 semiconductor layer
14 insulating layer
15 ohmic contact layer
16 drain electrode
17 source electrode
18 insulating protective layer
21 pixel electrode
22 common electrode
23 storage capacitor
24 drain electrode
25 data bus line
27 source bus line
29 common line
30 buffer layer

The invention claimed is:
1. A liquid crystal composition which comprises:
a compound represented by General Formula (II):

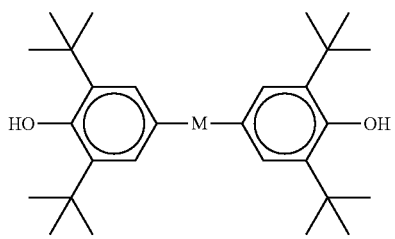

(II)

in General Formula (II), M represents an alkylene group having carbon atom number of 4 to 10; and,
a compound represented by General Formula (K):

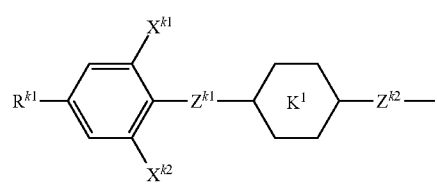

(K)

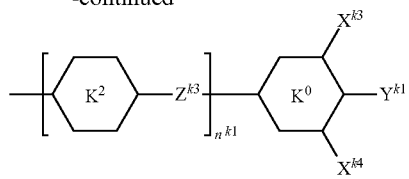

-continued in General Formula (K), $R^{k1}$'s each independently represent an alkyl group having carbon atom number of 1 to 10 or an alkenyl group having carbon atom number of 2 to 10, in which one or two or more non-adjacent —$CH_2$— in the group may be each independently substituted with —C≡C—, —O—, —CO—, —COO—, or —OCO—, and one or two or more non-adjacent hydrogen atoms in the group may be each independently substituted with a fluorine atom,
ring $K^1$ and ring $K^2$ each independently represent a 1,4-cyclohexylene group in which one or two or more non-adjacent —$CH_2$— in the group may be substituted with —O— or —S— or a 1,4-phenylene group in which one or two or more non-adjacent —CH= in the group may be substituted with —N=, and the hydrogen atoms in the group may be each independently substituted with a cyano group, a fluorine atom, or a chlorine atom,
ring $K^0$ represents a naphthalene-2,6-diyl group or a 1,4-phenylene group in which the hydrogen atoms in the group may be each independently substituted with a fluorine atom,
$Z^{k1}$ represents —$OCH_2$— or —$OCF_2$—,
$Z^{k2}$, or $Z^{k3}$ each independently represents a single bond, —$CH_2CH_2$—, —$(CH_2)_4$—, —$OCH_2$—, —$CH_2O$—, —$OCF_2$—, —$CF_2O$—, —$CH_2CH_2CF_2O$—, —COO—, —OCO—, or —C≡C—,
$n^{k1}$'s each independently represent 0, 1, 2, 3, or 4, with the proviso that, when $n^{k1}$ is 2 or more, the rings $K^2$ may be the same as or different from each other, and
$X^{k1}$, $X^{k2}$, $X^{k3}$, and $X^{k4}$ each independently represent a hydrogen atom or a fluorine atom, and $Y^{k1}$'s each independently represent a fluorine atom, a cyano group, a trifluoromethyl group, a fluoromethoxy group, a difluoromethoxy group, a trifluoromethoxy group, or a 2,2,2-trifluoroethyl group,
wherein the liquid crystal composition has no drop mark in a drop mark evaluation of a liquid crystal display element prepared by the liquid crystal composition by visually evaluating a drop mark appearing white on a black screen of the liquid crystal display element.
2. The liquid crystal composition according to claim 1, wherein the compound represented by General Formula (II) is a compound represented by General Formula (II-a):

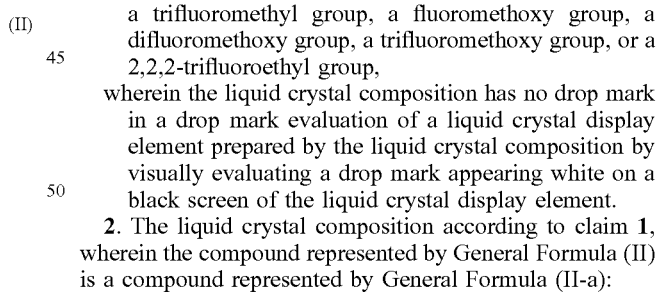

(II-a)

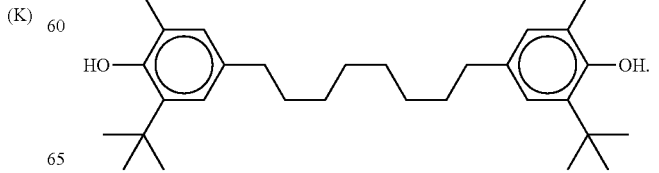

3. The liquid crystal composition according to claim 1, further comprising a polymerizable compound.

4. A liquid crystal display element comprising a first substrate which is provided with a common electrode formed of a transparent conductive material, a second substrate which is provided with a pixel electrode formed of a transparent conductive material and a thin film transistor for controlling a pixel electrode disposed on each pixel, and a liquid crystal composition sandwiched between the first substrate and the second substrate, in which the alignment of liquid crystal molecules in the liquid crystal composition without voltage application is approximately parallel or approximately vertical to the substrate and the liquid crystal composition described in claim 1 is used as the liquid crystal composition of the element.

5. A liquid crystal display element, wherein the liquid crystal display element is produced by polymerization of a polymerizable compound contained in the liquid crystal composition of claim 1 with voltage application or without voltage application.

* * * * *